United States Patent
Carvallo Pinto et al.

(10) Patent No.: US 12,522,817 B2
(45) Date of Patent: Jan. 13, 2026

(54) COMPOSITIONS AND METHODS FOR CAPTURING TARGET NUCLEIC ACIDS

(71) Applicant: Gen-Probe Incorporated, San Diego, CA (US)

(72) Inventors: Marcela Alejandra Carvallo Pinto, San Diego, CA (US); Ankur H. Shah, San Diego, CA (US)

(73) Assignee: GEN-PROBE INCORPORATED, San Diego, CA (US)

(*) Notice: Subject to any disclaimer, the term of this patent is extended or adjusted under 35 U.S.C. 154(b) by 872 days.

(21) Appl. No.: 17/775,053

(22) PCT Filed: Nov. 13, 2020

(86) PCT No.: PCT/US2020/060594
§ 371 (c)(1),
(2) Date: May 6, 2022

(87) PCT Pub. No.: WO2021/097358
PCT Pub. Date: May 20, 2021

(65) Prior Publication Data
US 2022/0396786 A1    Dec. 15, 2022

Related U.S. Application Data

(60) Provisional application No. 62/935,376, filed on Nov. 14, 2019.

(51) Int. Cl.
*C12N 15/10*  (2006.01)

(52) U.S. Cl.
CPC ................ *C12N 15/1013* (2013.01)

(58) Field of Classification Search
CPC .............. C12N 15/1003; C12N 15/1013
See application file for complete search history.

(56) References Cited

U.S. PATENT DOCUMENTS

| | | | |
|---|---|---|---|
| 11,162,091 B2 | 11/2021 | Gao et al. | |
| 11,162,145 B2 | 11/2021 | Chelliserry et al. | |
| 2013/0209992 A1 | 8/2013 | Becker et al. | |
| 2014/0065617 A1 | 3/2014 | Getman | |
| 2017/0137805 A1* | 5/2017 | Pugia | C12Q 1/6806 |
| 2017/0285025 A1 | 10/2017 | Getman et al. | |
| 2020/0165599 A1 | 5/2020 | Shah | |
| 2021/0269854 A1* | 9/2021 | Jost | C12Q 1/6806 |

FOREIGN PATENT DOCUMENTS

| | | |
|---|---|---|
| CN | 101665785 B | 2/2011 |
| CN | 103966350 A | 8/2014 |
| WO | 2006089154 A1 | 8/2006 |
| WO | 2007140279 A2 | 12/2007 |
| WO | 2018226798 A1 | 12/2018 |

OTHER PUBLICATIONS

PCT, International Search Report and Written Opinion for Application No. PCT/US2020/060594, mailed Feb. 12, 2021, 11 pages.

* cited by examiner

*Primary Examiner* — Jezia Riley
(74) *Attorney, Agent, or Firm* — Sherbina Intellectual Property; Nicholas V. Sherbina; Jeffrey E. Landes

(57) ABSTRACT

Capture mixtures and activated capture mixtures are provided that are useful for nucleic acid separation and purification are provided. The mixtures comprise lithium lauryl sulfate, lithium hydroxide, a zwitterionic sulfonic acid buffering agent, and optionally, proteinase K, capture probes comprising a first specific binding partner (SBP), and a second specific binding partner immobilized to a solid support. Related combinations, methods, uses, and kits, are also provided.

14 Claims, No Drawings
Specification includes a Sequence Listing.

COMPOSITIONS AND METHODS FOR CAPTURING TARGET NUCLEIC ACIDS

CROSS-REFERENCE TO RELATED APPLICATIONS

This application is a national phase entry pursuant to 35 U.S.C. § 371 of International Application No. PCT/US2020/060594, filed Nov. 13, 2020, which claims the benefit under 35 U.S.C. § 119(e) of U.S. Provisional Application No. 62/935,376, filed Nov. 14, 2019, the disclosure of which is hereby incorporated by reference in its entirety.

TECHNICAL FIELD

This disclosure relates to the field of molecular biology, more particularly to methods and compositions for nucleic acid isolation from a mixture, such as a sample, by using a capture mixture comprising a population of probes that hybridize to target nucleic acid(s) and to a specific binding partner immobilized on a solid support, a solid support comprising the specific binding partner, lithium lauryl sulfate, lithium hydroxide, and a zwitterionic sulfonic acid buffering agent, to allow separation from other components of the mixture.

SEQUENCE LISTING

The present application is filed with a Sequence Listing in electronic format. The Sequence Listing is provided as a file entitled "2020-10-27_01159-0041-00PCT_SEQ_LIST_ST25.txt" created on Oct. 27, 2020, which is 12,288 bytes in size. The information in the electronic format of the sequence listing is incorporated herein by reference in its entirety.

INTRODUCTION AND SUMMARY

Many molecular biology procedures, such as in vitro amplification and in vitro hybridization of nucleic acids, include isolation (e.g., capture) of nucleic acids from other sample components to facilitate subsequent steps. Methods of nucleic acid isolation may isolate all nucleic acids present in a sample, different types of nucleic acids based on physical characteristics, or specific nucleic acids from a sample. Many methods involve complicated procedures, use harsh chemicals or conditions, or require a long time to complete the nucleic acid isolation. Some methods involve use of specialized oligonucleotides, each specific for an intended target nucleic acid, which adds complexity to the design, optimization, and performance of methods, particularly if isolation of more than one target nucleic acid is desired or if the sequence of the desired target nucleic acid is unknown. Some methods isolate target nucleic acids without requiring a particular target sequence but do not isolate all sequences efficiently. Thus, there remains a need for capture mixtures with improved simplicity, capture efficiency, and speed with respect to isolating nucleic acids of interest from other sample components. The present disclosure aims to meet this need and/or provide other benefits, or at least provide the public with a useful choice.

Accordingly, the following embodiments are among those provided by the disclosure.

Embodiment 1 is a capture mixture for isolating a target nucleic acid from a sample, said capture mixture comprising:
(a) lithium lauryl sulfate;
(b) lithium hydroxide; and
(c) a zwitterionic sulfonic acid buffering agent;
wherein:
(i) the lithium lauryl sulfate is present at a concentration of about 5%-35% by weight relative to total solids in the mixture or a concentration of about 35-120 g/L; and/or
(ii) the lithium hydroxide is present at a concentration of about 6%-15% by weight relative to total solids in the mixture or a concentration of about 14-50 g/L; and/or
(iii) the capture mixture comprises a $C_{2-6}$ dicarboxylic acid; and/or
(iv) the capture mixture comprises proteinase K; and/or
(v) the capture mixture comprises (1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and (2) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and/or
(vi) (1) the first population of capture probes;
(2) optionally the second population of capture probes; and
(3) a solid support comprising the SBP2 immobilized thereto;
wherein the total concentration of the capture probes is about 1-10 mg/L, and/or solid support is beads and the beads are present at a concentration of about 0.15%-1% by weight relative to total solids in the mixture or about 300-2200 mg/L; and/or
(vii) the capture mixture does not comprise one or more of a phosphate buffer such as a $NaH_2PO_4/Na_2HPO_4$ buffer, a chelator such as EDTA or EGTA, or LiCl.

Embodiment 2 is the capture mixture of Embodiment 1, wherein the capture mixture comprises water.

Embodiment 3 is the capture mixture of Embodiment 1 or Embodiment 2, wherein the lithium lauryl sulfate is present at a concentration of about 5%-35% by weight relative to total solids in the mixture or a concentration of about 20-120 g/L.

Embodiment 4 is capture mixture of Embodiment 1 or Embodiment 2, wherein the lithium lauryl sulfate is present at a concentration of about 8%-15%, or about 9%-12%, or about 11% by weight relative to total solids in the mixture or a concentration of about 20-45 g/L, or about 25-40 g/L, or about 25-35 g/L, or about 30 g/L, or about 39 g/L.

Embodiment 5 is capture mixture of Embodiment 3, wherein the lithium lauryl sulfate is present at a concentration of about 5%-35% by weight relative to total solids in the mixture or a concentration of about 35-120 g/L.

Embodiment 6 is capture mixture of Embodiment 5, wherein the lithium lauryl sulfate is present at a concentration of 9%-30%, or about 9%-14%, or about 10%-13%, or about 25%-30%, or about 11%, by weight relative to total solids in the mixture, or a concentration of about 35-40 g/L, or about 100 g/L.

Embodiment 7 is the capture mixture of any one of Embodiments 1 to 4, wherein the lithium hydroxide is present at a concentration of about 6%-15% by weight relative to total solids in the mixture or a concentration of about 14-40 g/L.

Embodiment 8 is the capture mixture of Embodiment 7, wherein the lithium hydroxide is present at a concentration of about 8%-13%, or about 10%-12.5%, or about 10%-11%, or about 10.4% by weight relative to total solids in the mixture, or a concentration of about 17-40 g/L, or about 18-20 g/L, or about 27-30 g/L, or about 37 g/L, or about 19 g/L, or about 28.5 g/L.

Embodiment 9 is capture mixture of any one of the preceding Embodiments, wherein the capture mixture comprises a $C_{2-6}$ dicarboxylic acid.

Embodiment 10 is the capture mixture of Embodiment 9, wherein the $C_{2-6}$ dicarboxylic acid is succinic acid.

Embodiment 11 is the capture mixture of Embodiment 9 or Embodiment 10, wherein the dicarboxylic acid is present at a concentration of about 7%-12%, or about 7.5%-11%, or about 10%, or about 9.9% by weight relative to the total solids in the mixture, or a concentration of about 25-40 g/L, or about 25-30 g/L, or about 33-38 g/L, or about 35 g/L, or about 27 g/L, or about 27.2 g/L.

Embodiment 12 is the capture mixture of any one of the preceding Embodiments, wherein the capture mixture comprises proteinase K.

Embodiment 13 is the capture mixture of Embodiment 12, wherein the proteinase K in the capture mixture has a specific activity in the range of about 2.5-12 U/mL, or about 3-10 U/mL, or about 5 U/mL (optionally where the specific activity is measured, e.g., with a chromozym assay, Roche).

Embodiment 14 is the capture mixture of Embodiment 12 or Embodiment 13, wherein the proteinase K is present in the capture mixture at a concentration of about 1-20 mg/mL, or about 1-10 mg/mL, or about 1-5 mg/mL, or about 1-4 mg/mL, or about 1.5-3 mg/mL, or about 2 mg/mL, or about 3 mg/mL, or about 4 mg/mL.

Embodiment 15 is the capture mixture of any one of the preceding Embodiments, wherein the capture mixture comprises:
(1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and
(2) optionally a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and
(3) a solid support comprising the SBP2 immobilized thereto;

wherein the total concentration of the capture probes is about 1-10 mg/L, and/or solid support is beads and the beads are present at a concentration of about 0.15%4% by weight relative to total solids in the mixture or about 300-2800 mg/L.

Embodiment 16 is the capture mixture of any one of the preceding Embodiments, wherein the capture mixture comprises:
(1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and
(2) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2.

Embodiment 17 is the capture mixture of any one of the preceding Embodiments, wherein the capture mixture comprises the SBP2 immobilized to the solid support.

Embodiment 18 is the capture mixture of Embodiment 17, wherein the solid support is beads, such as magnetic beads or silica beads.

Embodiment 19 is the capture mixture of any one of the preceding Embodiments, wherein the solid support on which SBP2 is immobilized is beads and the beads are present at a concentration of 0.03%-1.0% by weight relative to total solids in the mixture or a concentration of about 150-2800 mg/L.

Embodiment 20 is the capture mixture of Embodiment 19, wherein the beads are present at a concentration of about 0.04%-0.8%, or about 0.03%-0.1%, or about 0.2%-0.3%, or about 0.7%-0.8%, or about 0.2% by weight relative to total solids in the mixture, or a concentration of 150-1200 mg/L, or about 150-250 mg/L, or about 500-700 mg/L, or about 1800-2800 mg/L, or about 200 mg/L, or about 260 mg/L, or about 600 mg/L, or about 780 mg/L, or about 2000 mg/L, or about 2600 mg/L.

Embodiment 21 is the capture mixture of any one of the preceding Embodiments, wherein the capture probes are present at a total concentration of about 0.5-15 mg/L, or about 0.5-1 mg/L, or about 2-10 mg/L, or about 4-9 mg/L, or about 7-8 mg/L, or about 9.5 mg/L, or about 7.4 mg/L.

Embodiment 22 is the capture mixture of Embodiment 21, wherein the capture mixture comprises the first population and the second population.

Embodiment 23 is the capture mixture of Embodiment 22, wherein the first population and the second population are each present at about the same concentration.

Embodiment 24 is the capture mixture of Embodiment 23, wherein the first population and the second population are each present at a concentration of about 3-4 mg/L, or about 3.7 mg/L.

Embodiment 25 is the capture mixture of any of the preceding Embodiments, wherein the zwitterionic sulfonic acid buffering agent is 4-(2-hydroxyethyl)-1-piperazineethanesulfonic acid (HEPES).

Embodiment 26 is the capture mixture of any one of the preceding Embodiments, wherein the zwitterionic sulfonic acid buffering agent is present at a concentration of about 50%-85%, or about 52.5%-57.5%, or about 64%-70%, or about 72%-82% relative to the total solids in the mixture, or a concentration of about 150-275 g/L, or about 175-260 g/L, or about 170-200 g/L, or about 244 g/L, or about 188 g/L.

Embodiment 27 is the capture mixture of any one of Embodiments 2 to 26, further comprising an anti-foaming agent, optionally wherein the anti-foaming agent is a 3-dimensional siloxane defoamer, and the 3-dimensional siloxane defoamer is emulsified in water.

Embodiment 28 is the capture mixture of Embodiment 27, wherein the anti-foaming agent is present at a concentration of from about 0.02% w/v to about 0.1% w/v, or from about 0.03% w/v to about 0.08% w/v, or from about 0.03% w/v to about 0.05% w/v, or about 0.05% w/v, or about 0.04% w/v.

Embodiment 29 is the capture mixture of any one of Embodiment 2 to 28, wherein two, three, four, five, six, or seven of the following are true: (i) the first population and the second population are each present at a concentration of about 3.7 mg/L; (ii) the SBP2 is present at a concentration of about 0.6 mg/L, (iii) the lithium lauryl sulfate is present at a concentration of about 30 g/L; (iv) the lithium hydroxide is present at a concentration of about 28.5 g/L; (v) the succinic acid is present at a concentration of about 27.2 g/L; (vi) the zwitterionic sulfonic acid buffering agent is HEPES and is present at a concentration of about 188 g/L; and (vii) the anti-foaming agent is present at a concentration of about 0.04% w/v.

Embodiment 30 is the capture mixture of any one of the preceding Embodiments, wherein the poly-(k) sequence comprises the randomized sequence comprising G and U/T nucleotides.

Embodiment 31 is the capture mixture of any one of the preceding Embodiments, wherein the first region of the first population comprises at least about 13, 14, 15, 16, 17, 18, 19, 20, 21, 22, 23, 24, 25, 26, 27, 28, 29, or 30 nucleotides of randomized poly-(k) sequence.

Embodiment 32 is the capture mixture of any one of the preceding Embodiment, wherein the poly-(k) sequence comprises at least about 13, 14, 15, 16, 17, 18, 19, 20, 21, 22, 23, 24, 25, 26, 27, 28, 29, or 30 nucleotides of a non-randomized repeating (G and U/T) sequence.

Embodiment 33 is the capture mixture of any one of the preceding Embodiments, wherein the first region of the first population is at least 13, 14, 15, 16, 17, 18, 19, 20, 21, 22, 23, 24, 25, 26, 27, 28, 29, or 30 nucleotides in length.

Embodiment 34 is the capture mixture of any one of the preceding Embodiments, wherein the first region of the first population consists of the randomized G and U/T nucleotides, the non-randomized repeating G and U/T nucleotides, or a combination thereof.

Embodiment 35 is the capture mixture of any one of Embodiments 1 to 33, wherein the first region of the first population further comprises a linker sequence between the poly-(k) sequence and a second poly(k) sequence, and the second poly-(k) sequence comprises (i) a randomized sequence comprising G and U/T nucleotides, or (ii) a non-randomized repeating (G and U/T) sequence.

Embodiment 36 is the capture mixture of Embodiment 35, wherein the poly-(k) sequence is at least about 6 residues in length and the second poly(k) sequence is at least about 6 residues in length.

Embodiment 37 is the capture mixture of any one of the preceding Embodiments, wherein the first region of the first population comprises 2'-O-methyl modified RNA residues.

Embodiment 38 is the capture mixture of any of the preceding Embodiments, wherein the first region of the first population comprises a poly-(k)$_{18}$, poly-(k)$_{24}$, or poly-(k)$_{25}$ sequence.

Embodiment 39 is the capture mixture of any one of the preceding Embodiments, wherein the SBP comprises a homopolymeric sequence.

Embodiment 40 is the capture mixture of Embodiment 39, wherein the SBP comprises a dT$_3$dA$_{30}$ (SEQ ID NO: 23) or dA$_{30}$ (SEQ ID NO: 24) sequence.

Embodiment 41 is the capture mixture of any one of the preceding Embodiments, wherein the SBP is situated 3' to the first region of the first population.

Embodiment 42 is the capture mixture of any one of the preceding Embodiments, wherein the poly-(r) sequence comprises the randomized sequence comprising G and A nucleotides.

Embodiment 43 is the capture mixture of Embodiment 42, wherein the first region of the second population comprises at least about 2, 3, 4, 5, 6, 7, 8, 9, 10, 11, 12, 13, 14, 15, 16, 17, 18, 19, 20, 21, 22, 23, 24, 25, 26, 27, 28, 29, or 30 nucleotides of randomized poly-(r) sequence.

Embodiment 44 is the capture mixture of any one of the preceding Embodiments, wherein the poly-(r) sequence comprises at least about 4, 5, 6, 7, 8, 9, 10, 11, 12, 13, 14, 15, 16, 17, 18, 19, 20, 21, 22, 23, 24, 25, 26, 27, 28, 29, or 30 nucleotides of a non-randomized repeating (A and G) sequence.

Embodiment 45 is the capture mixture of any one of the preceding Embodiments, wherein the first region of the second population is at least 13, 14, 15, 16, 17, 18, 19, 20, 21, 22, 23, 24, 25, 26, 27, 28, 29, or 30 nucleotides in length.

Embodiment 46 is the capture mixture of any one of the preceding Embodiments, wherein the first region of the second population consists of the randomized G and A nucleotides, the non-randomized repeating (A and G) sequence, or a combination thereof.

Embodiment 47 is the capture mixture of any one of the preceding Embodiments, wherein the first region of the second population further comprises a linker sequence between the poly-(r) sequence and a second poly(r) sequence, and the second poly-(r) sequence comprises (i) a randomized sequence comprising G and A nucleotides, or (ii) a non-randomized repeating (A and G) sequence.

Embodiment 48 is the capture mixture of Embodiment 47, wherein the poly-(r) sequence is at least about 6 residues in length and the second poly(r) sequence is at least about 6 residues in length.

Embodiment 49 is the capture mixture of any one of the preceding Embodiments, wherein the first region of the second population comprises 2'-O-methyl modified RNA residues.

Embodiment 50 is the capture mixture of any one of the preceding Embodiments, wherein the first region of the second population comprises a poly-(r)$_{18}$, poly-(r)$_{24}$, or poly-(r)$_{25}$ sequence.

Embodiment 51 is the capture mixture of any one of the preceding Embodiments, wherein the SBP3 comprises a homopolymeric sequence.

Embodiment 52 is the capture mixture of Embodiment 51, wherein the SBP3 comprises a dT$_3$dA$_{30}$ (SEQ ID NO: 23) or dA$_{30}$ (SEQ ID NO: 24) sequence.

Embodiment 53 is the capture mixture of any one of the preceding Embodiments, wherein the SBP3 is situated 3' to the first region of the second population.

Embodiment 54 is the capture mixture of any one of the preceding Embodiments, wherein one or both of the SBP and the SBP3 are substantially complementary nucleic acid sequences to the SBP2.

Embodiment 55 is the capture mixture of any one of the preceding Embodiments, wherein the SBP2 comprises a poly dT sequence.

Embodiment 56 is the capture mixture of Embodiment 55, wherein the SBP2 comprises a $dT_{14}$ sequence.

Embodiment 57 is the capture mixture of Embodiment 1, comprising:
(a) lithium lauryl sulfate;
(b) lithium hydroxide;
(c) the zwitterionic sulfonic acid buffering agent;
(d) the $C_{2-6}$ dicarboxylic acid; and
(e) proteinase K.

Embodiment 58 is the capture mixture of Embodiment 57, wherein the capture mixture comprises:
(f) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2);
(g) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and
(h) a solid support comprising the SBP2 immobilized thereto.

Embodiment 59 is a pre-mix formulation comprising the capture mixture of any one of the preceding Embodiments, wherein the pre-mix formulation does not comprise proteinase K, and when the formulation comprises water, the components are present at 1.3× the listed solution concentrations.

Embodiment 60 is the pre-mix formulation of embodiment 59, comprising about 244 g/L HEPES, about 39 g/L lithium lauryl sulfate, about 37 g/L lithium hydroxide, about 35 g/L succinic acid, about 0.04% w/v anti-foaming agent, about 3.7 mg/mL each of the first population and the second population, and about 780 mg/L of SBP2 immobilized on beads.

Embodiment 61 is an activated capture mixture comprising the capture mixture of any one of Embodiments 1 to 58, wherein the capture mixture comprises proteinase K.

Embodiment 62 is an activated capture mixture prepared by combining the pre-mix formulation of Embodiment 59 or Embodiment 60 and proteinase K.

Embodiment 63 is the activated capture mixture of Embodiment 61 or Embodiment 62, wherein the proteinase K in the activated capture mixture is present at a concentration of about 1-20 mg/mL, or about 1-5 mg/mL, or about 1-4 mg/mL, or about 1.5-3 mg/mL, or about 2 mg/mL, or about 3 mg/mL, or about 4 mg/mL.

Embodiment 64 is the activated capture mixture of Embodiment 62, wherein the activated capture mixture is prepared by combining the pre-mix formulation with a solution of proteinase K in a volume/volume ratio of about 3:1 to 6:1, or about 3:1 to 4:1, or about 3.475:1 (such as 139 mL:40 mL), wherein the concentration of proteinase K in the solution is about 5-20 mg/mL, or about 4.5-18 mg/mL, or about 5-15 mg/mL, or about 8-10 mg/mL, or about 9 mg/mL, and the proteinase K has a specific activity of about 12.5-50 U/mL, or about 20-30 U/mL, or about 25 U/mL.

Embodiment 65 is a reaction mixture comprising the capture mixture of any one of Embodiments 1 to 58 or the activated capture mixture of any one of Embodiments 61-64 and a target nucleic acid, wherein when proteinase K is present, it is optionally present at a concentration of about 0.4-2 mg/mL, or about 1 mg/mL, and/or optionally at a specific activity of about 1-6 U/mL, or about 2.5 U/mL.

Embodiment 66 is the reaction mixture of Embodiment 65, further comprising an internal control and an enhancer comprising lithium hydroxide.

Embodiment 67 is a reaction mixture prepared by combining the pre-mix formulation of Embodiment 59 or Embodiment 60, proteinase K, and a target nucleic acid, wherein the proteinase K is optionally present at a concentration of about 0.4-2 mg/mL, or about 1 mg/mL, and/or optionally at a specific activity of about 1-6 U/mL, or about 2.5 U/mL.

Embodiment 68 is the reaction mixture of Embodiment 67, prepared by combining the pre-mix formulation of Embodiment 59 or Embodiment 60, proteinase K, an internal control, a target nucleic acid, and an enhancer comprising lithium hydroxide.

Embodiment 69 is the reaction mixture of Embodiment 66 or Embodiment 68, wherein the concentration of lithium hydroxide in the enhancer is about 0.8 M-3.5 M, or about 1.0 M-2.75 M, or about 1.25 M-2.5 M, or about 1.5 M-2.0 M, or about 1.6 M-1.8 M, or about 1.68 M.

Embodiment 70 is the reaction mixture of any one of Embodiments 65 to 69, wherein the target nucleic acid is in a solution phase and/or associated with the capture probes.

Embodiment 71 is the reaction mixture of Embodiment 70, wherein the solution phase comprises a sample from an animal, environmental, food, or industrial source.

Embodiment 72 is the reaction mixture of Embodiment 70 or Embodiment 71, wherein the solution phase comprises a sample comprising peripheral blood, serum, plasma, cerebrospinal fluid, sputum, urine, or a swab specimen.

Embodiment 73 is the reaction mixture of any one of Embodiments 65 to 72, wherein the target nucleic acid is derived from peripheral blood, serum, or plasma.

Embodiment 74 is the reaction mixture of any one of Embodiments 70 to 72, wherein the target nucleic acid is derived from cells that have been treated to release intracellular components into the solution phase.

Embodiment 75 is a method for isolating a target nucleic acid from a sample, the method comprising:
a. contacting the capture mixture of any one of Embodiments 1 to 58 or the activated capture mixture of any one of Embodiments 61 to 64 which includes the first population of capture probes with a solution comprising a target nucleic acid to form a reaction mixture;
b. incubating the reaction mixture in conditions that allow hybridization of the first region of the first population with the target nucleic acid;
c. simultaneously with or subsequently to step (b), incubating the reaction mixture with a solid support comprising the SBP2 immobilized thereto in conditions that allow for association of the SBP (and the SBP3 if present) with the SBP2 immobilized to the support, thereby forming a hybridization complex in contact with a solution phase; and d. separating the support from the solution phase, thereby isolating the target nucleic acid from other components in the sample.

Embodiment 76 is the method of Embodiment 75 wherein step (a) comprises combining the activated capture mixture of any one of Embodiments 61 to 64 with an internal control, the solution comprising the target nucleic acid, and an enhancer comprising lithium hydroxide.

Embodiment 77 is the method of Embodiment 76, wherein the concentration of lithium hydroxide in the enhancer is about 0.8 M-3.5 M, or about 1.0 M-2.75 M, or about 1.25 M-2.5 M, or about 1.5 M-2.0 M, or about 1.6 M-1.8 M, or about 1.68 M.

Embodiment 78 is the method of any one of Embodiments 75 to 77, wherein the capture mixture or activated capture mixture does not comprise the solid support, and step (a) comprises combining the capture mixture or activated capture mixture with the solid support.

Embodiment 79 is the method of any one of Embodiments 75 to 78, wherein the target nucleic acid is derived from a sample that contains cells and the method comprises treating the cells before the contacting step to release intracellular components into the solution.

Embodiment 80 is the method of Embodiment 79, wherein treating comprises treating the sample with a detergent.

Embodiment 81 is the method of Embodiment 79 or Embodiment 80, wherein the sample is from an animal, environmental, food, or industrial source.

Embodiment 82 is the method of any one of Embodiments 79 to 81, wherein the sample comprises peripheral blood, serum, plasma, cerebrospinal fluid, sputum, urine, or a swab specimen.

Embodiment 83 is the method of any one of Embodiments 79 to 82, wherein the sample comprises a cellular lysate.

Embodiment 84 is the reaction mixture of any one of Embodiments 65 to 74, or the method of any one of Embodiments 75 to 83, wherein the target nucleic acid comprises DNA and/or RNA.

Embodiment 85 is the reaction mixture of any one of Embodiments 65 to 74, or the method of any one of Embodiments 75 to 83, wherein the target nucleic acid comprises a viral nucleic acid, a prokaryotic nucleic acid, a eukaryotic nucleic acid, a synthetic nucleic acid, or a combination thereof.

Embodiment 86 is a kit comprising:
(a) a first component comprising the capture mixture of any one of the preceding Embodiments; and
(b) a second component comprising lithium hydroxide.

Embodiment 87 is a kit comprising:
(a) a first component comprising a pre-mix formulation, wherein the pre-mix formulation comprises the capture mixture of any one of the preceding Embodiments, the pre-mix formulation does not comprise proteinase K, and when the formulation comprises water, the components are present at 1.3× the listed solution concentrations;
(b) a second component comprising lithium hydroxide; and
(c) a third component comprising proteinase K.

Embodiment 88 is kit of Embodiment 85 or Embodiment 87, wherein the second component comprises lithium hydroxide at a concentration of about 0.8 M-3.5 M, or about 1.0 M-2.75 M, or about 1.25 M-2.5 M, or about 1.5 M-2.0 M, or about 1.6 M-1.8 M, or about 1.68 M.

Embodiment 89 is the kit of Embodiment 87 or Embodiment 88, wherein the third component comprises proteinase K at a concentration of about 4.5-20 mg/mL, or about 4.5-18 mg/mL, or about 5-15 mg/mL, or about 8-10 mg/mL, or about 9 mg/mL, and the proteinase K has a specific activity of about 12.5-50 U/mL, or about 20-30 U/mL, or about 25 U/mL.

DETAILED DESCRIPTION

Before describing the present teachings in detail, it is to be understood that the disclosure is not limited to specific compositions or process steps, as such may vary. It should be noted that, as used in this specification and the appended claims, the singular form "a," "an," and "the" include plural references unless the context clearly dictates otherwise. Thus, for example, reference to "an oligomer" includes a plurality of oligomers and the like. The conjunction "or" is to be interpreted in the inclusive sense, i.e., as equivalent to "and/or," unless the inclusive sense would be unreasonable in the context.

It will be appreciated that there is an implied "about" prior to the temperatures, concentrations, times, and other numerical entries discussed in the present disclosure, such that slight and insubstantial deviations are within the scope of the present teachings herein. In general, the term "about" indicates insubstantial variation in a quantity of a component of a composition not having any significant effect on the activity or stability of the composition. Also, the use of "comprise," "comprises," "comprising," "contain," "contains," "containing," "include," "includes," and "including" are not intended to be limiting. It is to be understood that both the foregoing general description and detailed description are exemplary and explanatory only and are not restrictive of the teachings. To the extent that any material incorporated by reference is inconsistent with the express content of this disclosure, the express content controls.

Unless specifically noted, embodiments in the specification that recite "comprising" various components are also contemplated as "consisting of" or "consisting essentially of" the recited components; embodiments in the specification that recite "consisting of" various components are also contemplated as "comprising" or "consisting essentially of" the recited components; and embodiments in the specification that recite "consisting essentially of" various components are also contemplated as "consisting of" or "comprising" the recited components (this interchangeability does not apply to the use of these terms in the claims).

A. Definitions

"Sample" includes any specimen that may contain a target nucleic acid. Samples include "biological samples," which include any tissue or material derived from a living or dead organism that may contain target nucleic acid derived therefrom, including, e.g., peripheral blood, plasma, serum, lymph node, gastrointestinal tissue, cerebrospinal fluid, sputum, urine, a swab specimen, or other body fluids or materials. The biological sample may be treated to physically or mechanically disrupt tissue or cell structure, thus releasing intracellular components into a solution, which may further contain enzymes, buffers, salts, detergents, and the like, which are used to prepare, using standard methods, a biological sample for analysis. Also, samples may include processed samples, such as those obtained from passing samples over or through a filtering device, or following centrifugation, or by adherence to a medium, matrix, or support.

"Nucleic acid" refers to a multimeric compound comprising two or more covalently bonded nucleosides or nucleoside analogs having nitrogenous heterocyclic bases, or base analogs, where the nucleosides are linked together by phosphodiester bonds or other linkages to form a polynucleotide. Nucleic acids include RNA, DNA, or chimeric DNA-RNA polymers or oligonucleotides, and analogs thereof. A nucleic acid "backbone" may be made up of a variety of linkages, including one or more of sugar-phosphodiester linkages, peptide-nucleic acid bonds (in "peptide nucleic acids" or PNAs, see, e.g., International Patent Application Pub. No. WO 95/32305), phosphorothioate linkages, methylphosphonate linkages, or combinations thereof. Sugar moieties of the nucleic acid may be either ribose or deoxyribose, or similar compounds having known substitutions such as, for example, 2'-methoxy substitutions and 2'-halide substitutions (e.g., 2'-F). Nitrogenous bases may be conventional bases (A, G, C, T, U), analogs thereof (e.g., inosine, 5-methylisocytosine, isoguanine; see, e.g., The Biochemistry of the Nucleic Acids 5-36, Adams et al., ed., 11th ed., 1992; Abraham et al., 2007, BioTechniques 43: 617-24), which include derivatives of purine or pyrimidine bases (e.g., $N^4$-methyl deoxygaunosine, deaza- or aza-purines, deaza- or aza-pyrimidines, pyrimidine bases having substituent groups at the 5 or 6 position, purine bases having an altered or replacement substituent at the 2-, 6- and/or 8-position, such as 2-amino-6-methylaminopurine, $O^6$-methylguanine, 4-thio-pyrimidines, 4-amino-pyrimidines, 4-dimethylhydrazine-pyrimidines, and $O^4$-alkyl-pyrimidines, and pyrazolo-compounds, such as unsubstituted or 3-substituted pyrazolo [3,4-d]pyrimidine; U.S. Pat. Nos. 5,378,825 and 6,949,367, and International Patent Application Pub. No. WO 93/13121, each incorporated by reference herein). Nucleic acids may include "abasic" residues in which the backbone does not include a nitrogenous base for one or more residues (see. e.g., U.S. Pat. No. 5,585,481, incorporated by reference herein). A nucleic acid may comprise only conventional sugars, bases, and linkages as found in RNA and DNA, or may include conventional components and substitutions (e.g., conventional bases linked by a 2'-methoxy backbone, or a nucleic acid including a mixture of conventional bases and one or more base analogs). Nucleic acids may include "locked nucleic acids" (LNA), in which one or more nucleotide monomers have a bicyclic furanose unit locked in an RNA mimicking sugar conformation, which enhances hybridization affinity toward complementary sequences in single-stranded RNA (ssRNA), single-stranded DNA (ssDNA), or double-stranded DNA (dsDNA) (Vester et al., Biochemistry 43:13233-41, 2004, incorporated by reference herein). Nucleic acids may include modified bases to alter the function or behavior of the nucleic acid, e.g., addition of a 3'-terminal dideoxynucleotide to block additional nucleotides from being added to the nucleic acid. Synthetic methods for making nucleic acids in vitro are well-known in the art although nucleic acids may be purified from natural sources using routine techniques.

The term "polynucleotide" as used herein denotes a nucleic acid chain. Throughout this application, nucleic acids are designated by the 5'-terminus to the 3'-terminus. Synthetic nucleic acids, e.g., DNA, RNA, and DNA/RNA chimerics (including when non-natural nucleotides or analogues are included therein), are typically synthesized "3'-to-5'," i.e., by the addition of nucleotides to the 5'-terminus of a growing nucleic acid.

A "nucleotide" as used herein is a subunit of a nucleic acid consisting of a phosphate group, a 5-carbon sugar, and a nitrogenous base (also referred to herein as "nucleobase"). The 5-carbon sugar found in RNA is ribose. In DNA, the 5-carbon sugar is 2'-deoxyribose. The term also includes analogs of such subunits, such as a methoxy group at the 2' position of the ribose (also referred to herein as "2'-O-Me" or "2'-methoxy"). As used herein, unless otherwise indicated, a "T" residue in a 2'-methoxy oligonucleotide is interchangeable with a "U."

A "non-nucleotide unit" as used herein is a unit that does not significantly participate in hybridization of a polymer. Such units do not, for example, participate in any significant hydrogen bonding with a nucleotide, and would exclude units having as a component one of the five nucleotide bases or analogs thereof.

A "target nucleic acid" as used herein is a nucleic acid comprising a target sequence to be amplified. Target nucleic acids may be DNA or RNA as described herein, and may be either single-stranded or double-stranded. The target nucleic acid may include other sequences besides the target sequence, which may not be amplified.

"Target-hybridizing sequence" is used herein to refer to the portion of an oligomer that is configured to hybridize with a target nucleic acid. Target-hybridizing sequences may, but do not necessarily, include a linker (e.g., linker sequences or non-nucleotide chains) between segments that hybridize to a target.

The term "region," as used herein, refers to a portion of a nucleic acid wherein said portion is smaller than the entire nucleic acid. For example, when the nucleic acid in reference is a capture probe, the term "region" may be used to refer to the smaller target-hybridizing portion of the entire oligonucleotide, or the smaller portion that serves as a specific binding partner.

The interchangeable terms "oligomer," "oligo," and "oligonucleotide" refer to a nucleic acid having generally less than 1,000 nucleotide (nt) residues, including polymers in a range having a lower limit of about 5 nt residues and an upper limit of about 500 to 900 nt residues. In some embodiments, oligonucleotides are in a size range having a lower limit of about 12 to 15 nt and an upper limit of about 50 to 600 nt, and other embodiments are in a range having a lower limit of about 15 to 20 nt and an upper limit of about 22 to 100 nt. Oligonucleotides may be purified from naturally occurring sources or may be synthesized using any of a variety of well-known enzymatic or chemical methods. The term oligonucleotide does not denote any particular function to the reagent; rather, it is used generically to cover all such reagents described herein. An oligonucleotide may serve various different functions. For example, it may function as a primer if it is specific for and capable of hybridizing to a complementary strand and can further be extended in the presence of a nucleic acid polymerase; it may function as a primer and provide a promoter if it contains a sequence recognized by an RNA polymerase and allows for transcription (e.g., a T7 Primer); and it may function to detect a target nucleic acid if it is capable of hybridizing to the target nucleic acid, or an amplicon thereof, and further provides a detectible moiety (e.g., a fluorophore).

"Amplification" refers to any known procedure for obtaining multiple copies of a target nucleic acid sequence or its complement or fragments thereof. The multiple copies may be referred to as amplicons or amplification products, which can be double-stranded or single-stranded and can include DNA, RNA, or both. Amplification of "fragments" refers to production of an amplified nucleic acid that contains less than the complete target nucleic acid or its complement, e.g., produced by using an amplification oligonucleotide that hybridizes to, and initiates polymerization from, an internal position of the target nucleic acid. Known amplification methods include, for example, replicase-mediated amplification, polymerase chain reaction (PCR), ligase chain reaction (LCR), strand-displacement amplification (SDA), and transcription-mediated or transcription-associated amplification. Replicase-mediated amplification uses self-replicating RNA molecules, and a replicase such as QB-replicase (see. e.g., U.S. Pat. No. 4,786,600, incorporated by reference herein). PCR amplification uses a DNA polymerase, pairs of primers, and thermal cycling to synthesize multiple copies of two complementary strands of dsDNA or from a cDNA (see. e.g., U.S. Pat. Nos. 4,683,195; 4,683,202; and 4,800,159; each incorporated by reference herein). LCR amplification uses four or more different oligonucleotides to amplify a target and its complementary strand by using multiple cycles of hybridization, ligation, and denaturation (see. e.g., U.S. Pat. Nos. 5,427,930 and 5,516,663, each incorporated by reference herein). SDA uses a primer that contains a recognition site for a restriction endonuclease and an endonuclease that nicks one strand of a hemi-modified DNA duplex that includes the target sequence, whereby amplification occurs in a series of primer extension and strand displacement steps (see. e.g., U.S. Pat. Nos. 5,422,252; 5,547,861; and 5,648,211; each incorporated by reference herein). Amplification may be linear or exponential.

"Detection probe," "detection oligonucleotide," "probe oligomer," and "detection probe oligomer" are used interchangeably to refer to a nucleic acid oligomer that hybridizes specifically to a target sequence in a nucleic acid, or in an amplified nucleic acid, under conditions that promote hybridization to allow detection of the target sequence or amplified nucleic acid. Detection may either be direct (e.g., a probe hybridized directly to its target sequence) or indirect (e.g., a probe linked to its target via an intermediate molecular structure). Detection probes may be DNA, RNA, analogs thereof, or combinations thereof (e.g., DNA/RNA chimerics) and they may be labeled or unlabeled. Detection probes may further include alternative backbone linkages such as, e.g., 2'-O-methyl linkages. A detection probe's "target sequence" generally refers to a smaller nucleic acid sequence region within a larger nucleic acid sequence that hybridizes specifically to at least a portion of a probe oligomer by standard base pairing. A detection probe may comprise target-specific sequences and other sequences that contribute to the three-dimensional conformation of the probe (see, e.g., U.S. Pat. Nos. 5,118,801; 5,312,728; 6,849,412; 6,835,542; 6,534,274; and 6,361,945; and US Patent Application Pub. No. 20060068417; each incorporated by reference herein).

By "stable" or "stable for detection" is meant that the temperature of a reaction mixture is at least 2° C. below the melting temperature of a nucleic acid duplex.

As used herein, a "label" refers to a moiety or compound joined directly or indirectly to a probe that is detected or leads to a detectable signal. Direct labeling can occur through bonds or interactions that link the label to the probe, including covalent bonds or non-covalent interactions (e.g., hydrogen bonds, hydrophobic interactions, or ionic interactions) or formation of chelates or coordination complexes. Indirect labeling can occur through use of a bridging moiety or "linker," such as a binding pair member, an antibody, or additional oligomer, which is either directly or indirectly labeled, and which may amplify the detectable signal. Labels include any detectable moiety, such as a radionuclide, ligand (e.g., biotin, avidin), enzyme, enzyme substrate, reactive group, or chromophore (e.g., dye, particle, or bead that imparts detectable color), luminescent compound (e.g., bioluminescent, phosphorescent, or chemiluminescent labels), or fluorophore. Labels may be detectable in a homogeneous assay in which bound labeled probe in a mixture exhibits a detectable change different from that of an unbound labeled probe, e.g., instability or differential degradation properties.

"Capture probe," "capture oligonucleotide," "capture oligomer," "target capture oligomer," and "capture probe oligomer" are used interchangeably to refer to a nucleic acid oligomer that specifically hybridizes to a target sequence in a target nucleic acid by standard base pairing and joins to a binding partner on an immobilized probe to capture the target nucleic acid to a support. One example of a capture oligomer includes two binding regions: a sequence-binding region (e.g., target-specific portion) and an immobilized probe-binding region, usually on the same oligomer, although the two regions may be present on two different oligomers joined together by one or more linkers. Another embodiment of a capture oligomer uses a target-sequence binding region that includes random or non-random poly-GU, poly-GT, or poly U sequences to bind non-specifically to a target nucleic acid and link it to an immobilized probe on a support.

As used herein, an "immobilized oligonucleotide," "immobilized probe," "immobilized binding partner," "immobilized oligomer," or "immobilized nucleic acid" refers to a nucleic acid binding partner that joins a capture oligomer to a support, directly or indirectly. An immobilized probe joined to a support facilitates separation of a capture probe bound target from unbound material in a sample. One embodiment of an immobilized probe is an oligomer joined to a support that facilitates separation of bound target sequence from unbound material in a sample. Supports may include known materials, such as matrices and particles free in solution, which may be made of nitrocellulose, nylon, glass, polyacrylate, mixed polymers, polystyrene, silane, polypropylene, metal, or other compositions, of which one embodiment is magnetically attractable particles. Supports may be monodisperse magnetic spheres (e.g., uniform size+ 5%), to which an immobilized probe is joined directly (via covalent linkage, chelation, or ionic interaction), or indirectly (via one or more linkers), where the linkage or interaction between the probe and support is stable during hybridization conditions. Supports may be beads, such as magnetic or silica (magnetic or non-magnetic) beads, or a planar support, such as a chip, microfluidic device, or column.

By "complementary" is meant that the nucleotide sequences of similar regions of two single-stranded nucleic acids, or two different regions of the same single-stranded nucleic acid, have nucleotide base compositions that allow the single-stranded regions to hybridize together in a stable double-stranded hydrogen-bonded region under stringent hybridization or amplification conditions. Sequences that hybridize to each other may be completely complementary or partially complementary to the intended target sequence by standard nucleic acid base pairing (e.g., G:C, A:T, or A:U pairing). By "sufficiently complementary" is meant a contiguous sequence that is capable of hybridizing to another sequence by hydrogen bonding between a series of complementary bases, which may be complementary at each position in the sequence by standard base pairing or may contain one or more residues, including abasic residues, that are not complementary. Sufficiently complementary contiguous sequences typically are at least 80%, or at least 90%, complementary to a sequence to which an oligomer is intended to specifically hybridize. Sequences that are "sufficiently complementary" allow stable hybridization of a nucleic acid oligomer with its target sequence under appropriate hybridization conditions, even if the sequences are not completely complementary. When a contiguous sequence of nucleotides of one single-stranded region is able to form a series of "canonical" or "Watson-Crick" hydrogen-bonded base pairs with an analogous sequence of nucleotides of the other single-stranded region, such that A is paired with U or T and C is paired with G, the nucleotides sequences are "completely" complementary (see. e.g., Sambrook et al., Molecular Cloning: A Laboratory Manual, 2nd ed. (Cold Spring Harbor Laboratory Press, Cold Spring Harbor, N. Y., 1989) at §§ 1.90-1.91, 7.37-7.57, 9.47-9.51 and 11.47-11.57, particularly §§ 9.50-9.51, 11.12-11.13, 11.45-11.47 and 11.55-11.57, incorporated by reference herein). Appropriate hybridization conditions are well-known in the art, may be predicted based on sequence composition, or can be determined by using routine testing methods (see. e.g., Sambrook et al., supra (incorporated by reference herein).

It is understood that ranges (e.g., for concentrations, percent identity, etc.) are inclusive of all whole and partial numbers (e.g., at least 90% includes 90, 91, 93.5, 97.687, etc.). Reference to "the complement" of a particular sequence generally indicates a completely complementary sequence unless the context indicates otherwise.

"Wobble" base pairs refer to a pairing of a G to either a U or a T.

By "nucleic acid hybrid," "hybrid," or "duplex" is meant a nucleic acid structure containing a double-stranded, hydrogen-bonded region wherein the region is sufficiently stable to permit separation or purification of the duplex under appropriate conditions. Such hybrids may comprise RNA:RNA, RNA:DNA, or DNA:DNA duplex molecules, among others.

"Separating" or "purifying" means that one or more components of a sample are removed or separated from other sample components. Sample components include target nucleic acids usually in a generally aqueous solution phase, which may also include cellular fragments, proteins, carbohydrates, lipids, and other nucleic acids. "Separating" or "purifying" does not connote any degree of purification. Typically, separating or purifying removes at least 70%, or at least 80%, or at least 95% of the target nucleic acid from other sample components.

A concentration "by weight relative to total solids in a mixture" refers to the w/w ratio of a particular solid component in a mixture containing multiple solid components. For example, in a mixture of two solids, A and B, the concentration of A by weight relative to total solids in the mixture in the mixture is the mass of A divided by the mass of A+B. Solid components described herein include the zwitterionic sulfonic acid buffering agent, lithium lauryl sulfate, lithium hydroxide, the $C_{2-6}$ dicarboxylic acid, and, when present, beads as the solid support, and more generally, any substance with a melting point higher than 22° C. or which is solid at room temperature.

References, particularly in the claims, to "the sequence of SEQ ID NO: X" refer to the base sequence of the corresponding sequence listing entry and do not require identity of the backbone (including but not limited to RNA, 2'-O-Me RNA, DNA, or LNA) unless otherwise indicated. Furthermore, T and U residues are to be considered interchangeable for purposes of sequence listing entries unless otherwise indicated, e.g., a subject sequence is considered identical to a SEQ ID NO with a T as the sixth nucleotide regardless of whether the residue at the sixth position in the subject sequence is a T or a U.

B. Capture Mixtures, Activated Capture Mixtures, Methods, Uses, and Kits

One aspect disclosed herein is a capture mixture for isolating a target nucleic acid from a sample, said capture mixture comprising:
(a) lithium lauryl sulfate;
(b) lithium hydroxide; and
(c) a zwitterionic sulfonic acid buffering agent;
wherein:
   (i) the lithium lauryl sulfate is present at a concentration of about 5%-35% by weight relative to total solids in the mixture or a concentration of about 35-120 g/L; and/or
   (ii) the lithium hydroxide is present at a concentration of about 6%-15% by weight relative to total solids in the mixture or a concentration of about 14-40 g/L; and/or
   (iii) the capture mixture comprises a $C_{2-6}$ dicarboxylic acid; and/or
   (iv) the capture mixture comprises proteinase K; and/or
   (v) the capture mixture comprises (1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and (2) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and/or
   (vi) (1) the first population of capture probes;
       (2) optionally the second population of capture probes; and
       (3) a solid support comprising the SBP2 immobilized thereto;
       wherein the total concentration of the capture probes is about 1-10 mg/L, and/or solid support is beads and the beads are present at a concentration of about 0.15%-1% by weight relative to total solids in the mixture or about 300-2200 mg/L; and/or
   (vii) the capture mixture does not comprise one or more of a phosphate buffer such as a $NaH_2PO_4/Na_2HPO_4$ buffer, a chelator such as EDTA or EGTA, or LiCl.

In some embodiments, the capture mixture is a dry mixture of solid components. In some embodiments, the capture mixture is in solution phase. In some embodiments, the capture mixture comprises water.

In some embodiments, the lithium lauryl sulfate is present in the capture mixture at a concentration of about 5%-35% by weight relative to total solids in the mixture or a concentration of about 20-120 g/L. In some embodiments, the lithium lauryl sulfate is present at a concentration of about 8%-15%, or about 9%-12%, or about 11% by weight relative to total solids in the mixture or a concentration of about 20-40 g/L, or about 25-35 g/L, or about 30 g/L. In some embodiment, the lithium lauryl sulfate is present at a concentration of about 5%-35% by weight relative to total solids in the mixture or a concentration of about 35-120 g/L. In some embodiments, the lithium lauryl sulfate is present at a concentration of 9%-30%, or about 9%-14%, or about 10%-13%, or about 25%-30%, or about 11%, by weight relative to total solids in the mixture, or a concentration of about 35-40 g/L, or about 100 g/L.

In some embodiments, the lithium hydroxide is present in the capture mixture at a concentration of about 6%-15% by weight relative to total solids in the mixture or a concentration of about 14-40 g/L. In some embodiments, the lithium hydroxide is present at a concentration of about 8%-13%, or about 10%-12.5%, or about 10%-11%, or about 10.4% by weight relative to total solids in the mixture, or a concentration of about 17-35 g/L, or about 18-20 g/L, or about 27-30 g/L, or about 19 g/L, or about 28.5 g/L. Any solid formulation comprising a lithium hydroxide monohydrate, or any liquid formulation prepared from lithium hydroxide monohydrate, qualifies as comprising lithium hydroxide, and concentrations/amounts of lithium hydroxide in the solid and liquid formulations are calculated in terms of the molecular weight of lithium hydroxide monohydrate.

In some embodiments, the capture mixture comprises a $C_{2-6}$ dicarboxylic acid. In some embodiments, the $C_{2-6}$ dicarboxylic acid is succinic acid. In some embodiments, the dicarboxylic acid is present at a concentration of about 7%-12%, or about 7.5%-11%, or about 10%, or about 9.9% by weight relative to the total solids in the mixture, or a concentration of about 25-35 g/L, or about 25-30 g/L, or about 27 g/L, or about 27.2 g/L.

In some embodiments, the capture mixture comprises proteinase K. In some embodiments, the proteinase K in the capture mixture has a specific activity in the range of about 2.5-12 U/mL, or about 3-10 U/mL, or about 5 U/mL (optionally where the specific activity is measured, e.g., with a chromozym assay, Roche). In some embodiments, the proteinase K is present in the capture mixture at a concentration of about 1-20 mg/mL, or about 1-5 mg/mL, or about 1-4 mg/mL, or about 1.5-3 mg/mL, or about 2 mg/mL, or about 3 mg/mL, or about 4 mg/mL.

In some embodiments, the capture mixture comprises:
(1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and
(2) optionally a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and
(3) a solid support comprising the SBP2 immobilized thereto;
wherein the total concentration of the capture probes is about 1-10 mg/L, and/or solid support is beads and the beads are present at a concentration of about 0.15%4% by weight relative to total solids in the mixture or about 300-2200 mg/L.

In some embodiments, the capture mixture comprises:
(1) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and
(2) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2.

In some embodiments, the capture mixture comprises the SBP2 immobilized to the solid support. In some embodiments, the solid support is beads, such as magnetic beads or silica beads. In some embodiments, the solid support on which SBP2 is immobilized is beads and the beads are present at a concentration of 0.03%-1.0% by weight relative to total solids in the mixture or a concentration of about 150-2500 mg/L. In some embodiments, the beads are present at a concentration of about 0.04%-0.8%, or about 0.03%-0.1%, or about 0.2%-0.3%, or about 0.7%-0.8%, or about 0.2% by weight relative to total solids in the mixture, or a concentration of 150-1200 mg/L, or about 150-250 mg/L, or about 500-700 mg/L, or about 1800-2200 mg/L, or about 200 mg/L, or about 600 mg/L, or about 2000 mg/L.

In some embodiments, the capture probes are present at a total concentration of about 0.5-10 mg/L, or about 0.5-1 mg/L, or about 2-10 mg/L, or about 4-9 mg/L, or about 7-8 mg/L, or about 7.4 mg/L. In some embodiments, the capture mixture comprises the first population and the second population. In some embodiments, the first population and the second population are each present at about the same concentration. In some embodiments, the first population and the second population are each present at a concentration of about 3-4 mg/L, or about 3.7 mg/L.

In some embodiments, the zwitterionic sulfonic acid buffering agent is 4-(2-hydroxyethyl)-1-piperazineethanesulfonic acid (HEPES). In some embodiments, the zwitterionic sulfonic acid buffering agent is present at a concentration of about 50%-85%, or about 52.5%-57.5%, or about 64%-70%, or about 72%-82% relative to the total solids in the mixture, or a concentration of about 150-275 g/L, or about 175-260 g/L, or about 170-200 g/L, or about 188 g/L.

In some embodiments, the capture mixture is a solution, for example comprising water, and further comprises an anti-foaming agent, optionally wherein the anti-foaming agent is a 3-dimensional siloxane defoamer, and the 3-dimensional siloxane defoamer is emulsified in water. In some embodiments, the anti-foaming agent is present at a concentration of from about 0.02% w/v to about 0.06% w/v, or from about 0.03% w/v to about 0.05% w/v, or from about 0.03% w/v to about 0.05% w/v, or about 0.04% w/v.

In some embodiments, the capture mixture is configured such that wherein two, three, four, five, six, or seven of the following are true: (i) the first population and the second population are each present at about 3.7 mg/L; (ii) the SBP2 is present at a concentration of about 0.6 mg/L, (iii) the lithium lauryl sulfate is present at a concentration of about 30 g/L; (iv) the lithium hydroxide is present at a concentration of about 28.5 g/L; (v) the succinic acid is present at a concentration of about 27.2 g/L; (vi) the zwitterionic sulfonic acid buffering agent is HEPES and is present at a concentration of about 188 g/L; and (vii) the anti-foaming agent is present at a concentration of about 0.04% w/v.

As described herein, a capture mixture or activated capture mixture comprising a capture probe comprising one specific binding partner capable of specifically binding another specific binding partner comprises the situation in which the two specific binding partners are substantially complementary or complementary sequences and the two specific binding partners are annealed.

Exemplary reagents and target capture procedures are described herein, although those skilled in the art of molecular biology will appreciate that many different reagents are available to perform the basic steps of the reactions and tests described.

In some embodiments, the capture mixture comprises the first population and is useful for purifying or separating target nucleic acids from a sample. The populations of capture probes can bind target nucleic acids without a requirement for a particular sequence in the target and thus can be used to capture a variety of known or unknown target nucleic acids. In some embodiments, the capture probes are attached to a solid support, e.g., by binding specifically to an immobilized probe on the solid support. In this way, the capture probes along with target nucleic acid can be separated from other sample components.

The first population of capture probes comprises a first region that is at least about 12 residues in length and comprises at least one at least one poly-(k) sequence comprising (i) a randomized sequence comprising G and U/T nucleotides, or (ii) a non-randomized repeating (G and U/T) sequence, or (iii) a combination thereof; and a second region comprising a first specific binding partner (SBP), wherein the SBP is capable of specifically binding a second specific binding partner (SBP2). Exemplary first populations are described in Becker et al., US 2013/0209992 (Aug. 15, 2013), which is incorporated herein by reference. "G and U/T nucleotides" includes (i) G and U nucleotides, (ii) G and T nucleotides, or (iii) G, U, and T nucleotides. Similarly, the repeats in a non-randomized repeating (G and U/T) sequence may include (i) G and U nucleotides, (ii) G and T nucleotides, or (iii) G, U, and T nucleotides, and sequences such as (GU) and (GT) are considered repeats of each other notwithstanding the presence of a U in the former and a T in the latter. The first population of capture probes may include RNA, DNA, LNA, and/or 2'-O-methyl modified RNA residues.

The second population of capture probes comprises a first region that is at least about 12 residues in length and comprises a poly-(r) sequence comprising (i) a randomized sequence comprising G and A nucleotides, (ii) a non-randomized repeating (A and G) sequence, or (iii) a combination thereof; and a second region comprising a third specific binding partner (SBP3), wherein the SBP3 is capable of specifically binding SBP2. "Poly-(r)" is used as an abbreviation for poly-purine (A and/or G). In some embodiments, a poly-(r) sequence comprises (i) a randomized sequence comprising G and A nucleotides and (ii) a non-randomized repeating (A and G) sequence. The second population of capture probes may include RNA, DNA, LNA, and/or 2'-O-methyl modified RNA residues.

The nonspecific capture probes described herein may exist in many different embodiments. In some embodiments, they may be represented by the structures, RP-SBP or SBP-RP (or RP-SBP3 or SBP3-RP), in which "RP" stands for the randomized or repeating sequence (first region) and "SBP" stands for the "specific binding partner" (second region). In these representational diagrams, the SBP is represented in a linear manner relative to the RP, but those skilled in the art will appreciate that the SBP may be joined at any point to the RP of the capture probe. Thus, unless otherwise specified, the first and second regions do not necessarily have any particular spatial relationship to each other. In embodiments in which the RP is made up of G and U/T bases, the nonspecific capture probe may be represented by the diagramed structures $(k)_x$-SBP or SBP-$(k)_x$, in which "k" stands for the G and U/T bases of the RP portion, "x" stands for the length (in nt) of the k sequence, and "SBP" stands for the "specific binding partner." Although the SBP and $(k)_x$ sequences are shown in a linear manner, it will be understood that the SBP may be joined at any point to the capture probe. The same architecture applies to the poly-(r) population.

Some embodiments include one or more base analogs (e.g., inosine, 5-nitroindole) or abasic positions in the random polymer sequence. Some embodiments of the first population include a random polymer sequence that contains one or more sequences of poly-(k) bases, i.e., a random mixture of G and U/T bases, and some embodiments of the second population include a random polymer sequence that contains one or more sequences of poly-(r) bases, i.e., a random mixture of G and A bases (e.g., see WIPO Handbook on Industrial Property Information and Documentation, Standard ST.25 (1998), Table 1). G bases were chosen for their "wobble" property, i.e., G binds C or U/T. It is understood that synthesizing capture probes with a random polymer sequence provides a population of oligonucleotides that contain different random polymer sequences made up of the bases included during the synthesis of the random portion. For example, a population of nonspecific capture probes that include a 15 nt random polymer sequence made up of G and either A or U/T consists of up to $2^{15}$ unique members.

Although the length of one or more contiguous random sequences contained in a nonspecific capture probe may vary, a poly-(k) or poly-(r) sequence of about 12 nt or greater is sufficient for efficient target capture of many targets. The presence of non-random oligonucleotide or non-nucleotide spacers between random poly-(k) or poly-(r) sequences in a nonspecific capture probe may affect target capture efficiency. Nonspecific capture probes that include at least part of a random poly-(k) or poly-(r) sequence in LNA conformation may be more effective at ssDNA target capture than a nonspecific capture probe of similar length in DNA conformation, and those that contain a mixture of LNA and DNA residues may be more effective than those that contain all poly-(k) or poly-(r) sequences in LNA conformation. Nonspecific capture probes that include at least part of a random poly-(k) or poly-(r) sequence in LNA conformation may be more effective at target capture of RNA and ssDNA than target capture of double-stranded DNA (dsDNA). Nonspecific capture probes that include at least part of a random poly-(k) or poly-(r) sequence in LNA conformation may be more effective at RNA target capture than capture probes in which the same length of random poly-(k) or poly-(r) sequence is synthesized by using 2'-methoxy RNA bases. These general parameters may be applied to choose appropriate embodiments of capture probe populations for capture of an intended target nucleic acid or type of target nucleic acid that may be tested by using procedures as described in the examples that follow to select a nonspecific capture probe populations and conditions that provide the desired target capture results.

Embodiments of the nonspecific capture probes described herein use the following nomenclature to abbreviate the structure of the oligonucleotide components in a 5' to 3' orientation. An oligonucleotide that contains one or more residues of random G or U/T bases uses the term "$(k)_x$," where "k" stands for the random assortment of G and U/T, and "x" designates the number of positions in the random assortment of G and U/T bases. If the oligomer uses RNA bases with a backbone of 2'-methoxy linkages, the term may also include "2'-OMe" to designate the modified linkages of the random assortment of G and U/T bases, e.g., 2'-OMe-$(k)_x$. If the oligonucleotide uses standard DNA linkages, the term may include "d" to designate DNA for the random assortment of G and U/T bases, e.g., $d(k)_x$, whereas if the oligomer uses DNA bases with a locked nucleic acid (LNA) conformation, the term includes "L" to designate the LNA conformation for the random assortment of G and U/T bases, e.g., $L(k)_x$. An oligonucleotide made up of a combination of different portions may include one or more of these terms to define the entire structure. For example, an oligonucleotide made up of six random G and U/T bases (k bases) with standard DNA linkages, three A bases with standard DNA linkages, and five random G and U/T bases (k bases) with standard DNA linkages in a 5' to 3' orientation would be abbreviated as $d(k)_6$-$dA_3$-$d(k)_5$ (SEQ ID NO: 1). For another example, an oligonucleotide in a 5' to 3' orientation made up of five random G and U/T bases with LNA linkages, three A bases with DNA linkages, and four random G and U/T bases with DNA linkages would be abbreviated as $L(k)_5$-$dA_3$-$d(k)_4$ (SEQ ID NO: 2). For another example, an oligonucleotide in a 5' to 3' orientation made up of ten random G and U/T bases with 2'-methoxy linkages and a 3' tail of thirty A bases with standard DNA linkages would be abbreviated as 2'-OMe-$(k)_{10}$-$dA_{30}$ (SEQ ID NO: 3). Similarly, an oligonucleotide made up of six random G and A bases (r bases) with standard DNA linkages, three T bases with standard DNA linkages, and five random G and A bases (r bases) with standard DNA linkages in a 5' to 3' orientation would be abbreviated as $d(r)_6$-$dT_3$-$d(r)_5$ (SEQ ID NO: 4). For another example, an oligonucleotide in a 5' to 3' orientation made up of five random G and A bases with LNA linkages, three A bases with DNA linkages, and four random G and A bases with DNA linkages would be abbreviated as $L(r)_5$-$dA_3$-$d(r)_4$ (SEQ ID NO: 5). For another example, an oligonucleotide in a 5' to 3' orientation made up of ten random G and A bases with 2'-methoxy linkages and a 3' tail of thirty A bases with standard DNA linkages would be abbreviated as 2'-OMe-$(r)_{10}$-$dA_{30}$ (SEQ ID NO: 6).

In some embodiments, the first region of the first population is at least 13, 14, 15, 16, 17, 18, 19, 20, 21, 22, 23, 24, 25, 26, 27, 28, 29, or 30 nucleotides in length. In some embodiments, the first region of the first population comprises an $(k)_x$ sequence wherein x is a value ranging from 13 to 30, e.g., about 13, 14, 15, 16, 17, 18, 19, 20, 21, 22, 23, 24, 25, 26, 27, 28, 29, or 30. In some embodiments, the poly-(k) sequence comprises the randomized sequence comprising G and U/T nucleotides. In some embodiments, the first region of the first population comprises at least about 13, 14, 15, 16, 17, 18, 19, 20, 21, 22, 23, 24, 25, 26, 27, 28, 29, or 30 nucleotides of randomized poly-(k) sequence. In some embodiments, the poly-(k) sequence comprises the non-randomized repeating (G and U/T) sequence. In some embodiments, the first region of the first population comprises at least about 13, 14, 15, 16, 17, 18, 19, 20, 21, 22, 23, 24, 25, 26, 27, 28, 29, or 30 nucleotides of a non-randomized repeating (G and U/T) sequence. In some embodiments, the first region of the first population comprises a poly-$(k)_{18}$, poly-$(k)_{24}$, or poly-$(k)_{25}$ sequence. In some embodiments, including but not limited to when x is less than about 12, the first region of the first population comprises an $(k)_y$ sequence wherein the sum x+y is greater than or equal to about 12. In some embodiments, the first region of the first population consists of the randomized G and U/T nucleotides, the non-randomized repeating G and U/T nucleotides, or a combination thereof. In some embodiments, the first region of the first population comprises a random polymer sequence made up of guanine (G) and uracil/thymine (U/T) nucleotides, which may be deoxyribonucleotides, ribonucleotides, and/or 2'-O-methyl modified RNA residues (also referred to as 2'-O-Me nucleotides).

In some embodiments, the first region of the second population consists of the randomized G and A nucleotides, the non-randomized repeating (A and G) sequence, or a combination thereof. In some embodiments, the poly-(r) sequence comprises the randomized sequence comprising G and A nucleotides. In some embodiments, the first region of the second population comprises at least about 2, 3, 4, 5, 6, 7, 8, 9, 10, 11, 12, 13, 14, 15, 16, 17, 18, 19, 20, 21, 22, 23, 24, 25, 26, 27, 28, 29, or 30 nucleotides of randomized poly-(r) sequence. In some embodiments, the first region of the second population is at least 13, 14, 15, 16, 17, 18, 19, 20, 21, 22, 23, 24, 25, 26, 27, 28, 29, or 30 nucleotides in length. In some embodiments, the poly-(r) sequence comprises at least about 4, 5, 6, 7, 8, 9, 10, 11, 12, 13, 14, 15, 16, 17, 18, 19, 20, 21, 22, 23, 24, 25, 26, 27, 28, 29, or 30 nucleotides of a non-randomized repeating (A and G) sequence. In some embodiments, the second population comprises a first region that comprises an $(r)_x$ sequence wherein x is a value ranging from 2 to 30, e.g., about 2, 3, 4, 5, 6, 7, 8, 9, 10, 11, 12, 13, 14, 15, 16, 17, 18, 19, 20, 21, 22, 23, 24, 25, 26, 27, 28, 29, or 30. In some embodiments, the first region of the second population comprises a poly-$(r)_{18}$, poly-$(r)_{24}$, or poly-$(r)_{25}$ sequence. In some embodiments, including but not limited to when x is less than about 12, the first region comprises an $(r)_y$ sequence wherein the sum x+y is greater than or equal to about 12.

In some embodiments, the first population comprises a first region comprising a non-randomized repeating (A and U/T) sequence. Specifically, a non-randomized repeating sequence can include direct or inverted repeats, or both. Thus, examples of such a repeating sequence comprising repeats of G and U/T nucleotides include (TG)(GT)(TG)(GT)(TG)(GT) (SEQ ID NO: 7), (UG)(GU)(UG)(GU)(UG)(GU) (SEQ ID NO: 8), (TG)(TG)(TG)(GT)(TG)(TG) (SEQ ID NO: 9), (UG)(UG)(UG)(GU)(UG)(UG) (SEQ ID NO: 10), (TTG)(GTT)(GTT)(TTG) (SEQ ID NO: 11), (UUG)(GUU)(GUU)(UUG) (SEQ ID NO: 12), (TTG)(TTG)(TTG)(TTG) (SEQ ID NO: 13), (UUG)(UUG)(UUG)(UUG) (SEQ ID NO: 14), etc., in which the parentheses indicate the constituent repeats but do not have any structural meaning. In some embodiments, the non-randomized repeating sequence comprises one or more partial repeats, e.g., (TTG)(TTG)(TTG)(TTG)(T) (SEQ ID NO: 15) or (UUG)(UUG)(UUG)(UUG)(U) (SEQ ID NO: 16).

In some embodiments, the second population comprises a first region comprising a non-randomized repeating (A and G) sequence. Specifically, a non-randomized repeating sequence can include direct or inverted repeats, or both. Thus, examples of such a repeating sequence comprising repeats of A and G nucleotides include (AG)(GA)(AG)(GA)(AG)(GA) (SEQ ID NO: 17), (AG)(AG)(AG)(GA)(AG)(AG) (SEQ ID NO: 18), (AAG)(GAA)(GAA)(AAG) (SEQ ID NO: 19), (AAG)(AAG)(AAG)(AAG) (SEQ ID NO: 20), etc., in which the parentheses indicate the constituent repeats but do not have any structural meaning. In some embodiments, the non-randomized repeating sequence comprises one or more partial repeats, e.g., (AAG)(AAG)(AAG)(AAG)(A) (SEQ ID NO: 21).

The first region of the first population may consist of a poly-(k) sequence as described herein, a second poly-(k) sequence as described herein, and a linker between the poly-(k) sequence and the second poly-(k) sequence, wherein the second poly-(k) sequence comprises (i) a randomized sequence comprising G and U/T nucleotides, or (ii) a non-randomized repeating (G and U/T) sequence. In some embodiments, the first region may consist of a randomized (G and U/T) poly-(k) sequence as described herein, a second poly-(k) sequence as described herein, and a linker between the poly-(k) sequence and the second poly-(k) sequence. Alternatively, the first region may consist of a non-randomized repeating (G and U/T) poly-(k) sequence as described herein, a second poly-(k) sequence as described herein, and a linker between the poly-(k) sequence and the second poly-(k) sequence. In some embodiments, the linker is, for example, a non-nucleotide linker such as a C-9 linker or a nucleotide linker such as an arbitrary sequence, e.g., about 1-10 nucleotides in length. In some embodiments, the poly-(k) sequence is at least about 6 residues in length and the second poly-(k) sequence is at least about 6 residues in length.

The first region of the second population may consist of a poly-(r) sequence as described herein, a second poly-(r) sequence as described herein, and a linker between the poly-(r) sequence and the second poly-(r) sequence, wherein the second poly-(k) sequence comprises (i) a randomized sequence comprising G and A nucleotides, or (ii) a non-randomized repeating (G and A) sequence. In some embodiments, the first region may consist of a randomized (G and A) poly-(r) sequence as described herein, a second poly-(r) sequence as described herein, and a linker between the poly-(r) sequence and the second poly-(r) sequence. Alternatively, the first region may consist of a non-randomized repeating (G and A) poly-(r) sequence as described herein, a second poly-(r) sequence as described herein, and a linker between the poly-(r) sequence and the second poly-(r) sequence. In some embodiments, the linker is, for example, a non-nucleotide linker such as a C-9 linker or a nucleotide linker such as an arbitrary sequence, e.g., about 1-10 nucleotides in length. In some embodiments, the poly-(r) sequence is at least about 6 residues in length and the second poly-(r) sequence is at least about 6 residues in length.

Embodiments of nonspecific capture probes may be synthesized to include any of a variety of nucleic acid conformations, such as standard DNA or RNA oligonucleotides, or oligonucleotides that include one or more modified linkages in which the sugar moieties have substitutions (e.g., 2' methoxy or 2' halide), or one or more positions in alternative conformations, e.g., locked nucleic acid (LNA) or protein nucleic acid (PNA) conformation. A capture probe embodiment may include a non-nucleotide compound as a linker (e.g., C-9) that joins random polymer and/or nonrandom repeat segments of the capture probe. Some embodiments of nonspecific capture probes include those in which a random polymer portion is synthesized using 2'-O-methyl modified RNA residues or containing one or more residues in LNA conformation. The choice of conformation(s) to include in oligonucleotide portions of a nonspecific capture probe may depend on the intended target nucleic acid or type of target nucleic acid to be isolated. For example, a nonspecific capture probe with a random polymer region comprising 2'-O-methyl modified RNA residues can be used to capture RNA targets, whereas one with some LNA conformation in the random polymer region can be used to capture single-stranded DNA (ssDNA) targets. Some embodiments of capture probes include combinations of conformations (e.g., LNA and DNA), which may be adjacent or joined by a linker. In some embodiments, the first region consists of 2'-O-methyl modified RNA residues.

Nonspecific target capture probes can be synthesized using in vitro methods (e.g., Caruthers et al., Methods in Enzymology, vol. 154, p. 287 (1987); U.S. Pat. No. 5,252,723, Bhatt; WO 92/07864, Klem et al.). The synthesized oligonucleotides can be made using standard RNA bases and linkages, DNA bases and linkages, RNA bases with 2' methoxy linkages, DNA bases in LNA conformation, or in oligonucleotides that contain a combination of such structures. Oligonucleotides can be synthesized to include non-nucleotide spacers (e.g., C-9) or nucleic acid analogues (e.g., inosine or 5-nitroindole). In some embodiments, the non-specific portion(s) of the capture probe typically contain one or a series of positions that are random "k" residues, i.e., G or U/T bases, or random "r" residues, i.e., G or A bases. In some embodiments, random k and random r residues are synthesized by using a mixture that contains equal amounts of G and U/T bases or G and A bases, respectively. Some embodiments of the nonspecific capture probes include a 5' portion comprising the first region that hybridizes nonspecifically to a target nucleic acid and a 3' portion comprising the second region comprising the SBP (e.g., SBP or SBP3), wherein the SBP is a DNA "capture tail" sequence, e.g., made up of $dT_{0-3}dA_{18-30}$ (SEQ ID NO: 22), such as a $dT_3dA_{30}$ (SEQ ID NO: 23) or $dA_{30}$ (SEQ ID NO: 24) sequence. The capture tail portion (also sometimes referred to simply as a tail) allows the capture probe (with or without bound target nucleic acid) to associate with a solid support attached to poly-dT oligomers (SBP2) and be separated from the solution phase of a reaction mixture. It will be understood that any "tail" sequence or non-nucleic acid specific binding partner (SBP and/or SBP3) may be attached to a nonspecific capture probe, and the chosen specific binding partner on the support (SBP2) is a member of a specific binding pair with the SBP and/or SBP3.

The SBP component of a nonspecific capture probe may be any member of a specific binding pair that binds specifically to the SBP2, which may be part of an immobilized probe. Some embodiments of specific binding pairs suitable for use as SBP and SBP2 members (or SBP3/SBP2 members) include receptor and ligand pairs, enzyme and substrate or cofactor pairs, enzyme and coenzyme pairs, antibody (or antibody fragment) and antigen pairs, sugar and lectin pairs, biotin and avidin or streptavidin, ligand and chelating agent pairs, nickel and histidine, and completely or substantially complementary nucleic acid sequences. In some embodiments, the SBP and SBP2 (or SBP3/SBP2) members are substantially complementary nucleic acid sequences, such as complementary homopolymeric sequences, e.g., a capture probe includes a 3' substantially homopolymeric SBP (and/or SBP3) sequence that hybridizes to a complementary immobilized SBP2 sequence linked to a support. In some embodiments, the SBP comprises a homopolymeric sequence. In some embodiments, the SBP3 comprises a homopolymeric sequence. Other embodiments use non-nucleic acid binding pairs, such as biotin that binds specifically with avidin or streptavidin, as the SBP and SBP2 members (or SBP3/SBP2 members).

In some embodiments, the SBP and the SBP3 are capable of binding the same SBP2, and the SBP and SBP3 may be the same or different. For example, the SBP2 may be a poly-T sequence, and the SBP and SBP3 may be, independently, a $dA_{30}$ (SEQ ID NO: 24) or a $dT_3dA_{30}$ (SEQ ID NO: 23) sequence. In some embodiments, the SBP and SBP3 are identical to each other. In some embodiments, the SBP is situated 3' to the first region of the first population. In some embodiments, the SBP3 is situation 3' to the first region of the second population. In some embodiments, one or both of the SBP and the SBP3 are substantially complementary to the SBP2. In some embodiments, the SBP2 comprises a poly dT sequence. In some embodiments, the SBP2 comprises a $dT_{14}$ sequence.

An immobilized probe may be connected to a solid support by any linkage that is stable in the hybridization conditions used in the target capture method. In some embodiments, a solid support comprises monodisperse particles that can be retrieved from a mixture by using known methods, e.g., centrifugation, filtration, magnetic attraction, or other physical or electrochemical separation. In some embodiments, the monodisperse particles are magnetic microbeads or magnetic microparticles. In some embodiments, magnetic attraction is used to retrieve the particles from the mixture. In some embodiments, the captured target nucleic acid is isolated and concentrated on the support, i.e., target nucleic acid is concentrated on the support compared to its concentration in the initial sample, which may improve sensitivity of subsequent assay steps performed using the captured nucleic acids, such as an amplification assay step.

Nonspecific target capture methods are relatively fast and simple to perform, requiring in some embodiments less than an hour to complete, with the target capture reaction requiring in some embodiments as little as 5 minutes of incubation. Optional steps, such as washing of the captured nucleic acid, can be used to further purify the nucleic acid (e.g., about 20 additional minutes).

In some embodiments, the capture mixture as described herein comprises:
(a) lithium lauryl sulfate;
(b) lithium hydroxide;
(c) the zwitterionic sulfonic acid buffering agent;
(d) the $C_{2-6}$ dicarboxylic acid; and
(e) proteinase K.

In some embodiments, the capture mixture comprises:
(f) a first population of capture probes, comprising a first region that is at least about 12 residues in length and comprises at least one poly-(k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2);
(g) a second population of capture probes, comprising a first region that is at least about 12 residues in length and comprises a poly(r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and
(h) a solid support comprising the SBP2 immobilized thereto.

In some embodiments, the present disclosure relates to a pre-mix formulation comprising the capture mixture described herein, wherein the pre-mix formulation does not comprise proteinase K, and when the formulation comprises water, the components are present at 1.3× the listed solution concentrations.

In some embodiments, the present disclosure relates to an activated capture mixture comprising the capture mixture as described herein, wherein the capture mixture comprises proteinase K. In some embodiments, the present disclosure relates to an activated capture mixture prepared by combining the pre-mix formulation described herein and proteinase K. In some embodiments, the proteinase K in the activated capture mixture is present at a concentration of about 1-20 mg/mL, or about 1-5 mg/mL, or about 1-4 mg/mL, or about 1.5-3 mg/mL, or about 2 mg/mL, or about 3 mg/mL, or about 4 mg/mL. In some embodiments, the activated capture mixture is prepared by combining the pre-mix formulation with a solution of proteinase K in a volume/volume ratio of about 3:1 to 6:1, or about 3:1 to 4:1, or about 3.475:1 (such as 139 mL:40 mL), wherein the concentration of proteinase K in the solution is about 4.5-20 mg/mL, or about 4.5-18 mg/mL, or about 5-15 mg/mL, or about 8-10 mg/mL, or about 9 mg/mL, and the proteinase K has a specific activity of about 12.5-50 U/mL, or about 20-30 U/mL, or about 25 U/mL.

In some embodiments, the present disclosure relates to a reaction mixture comprising the capture mixture or activated capture mixture as described herein and a target nucleic acid. In some embodiments, the reaction mixture further comprises an internal control and an enhancer comprising lithium hydroxide. In some embodiments, the present disclosure relates to a reaction mixture prepared by combining the pre-mix formulation described herein, proteinase K, and a target nucleic acid. In some embodiments, the reaction mixture is prepared by combining the pre-mix formulation, proteinase K, an internal control, a target nucleic acid, and an enhancer comprising lithium hydroxide. In some embodiments, the concentration of lithium hydroxide in the enhancer is about 0.8 M-3.5 M, or about 1.0 M-2.75 M, or about 1.25 M-2.5 M, or about 1.5 M-2.0 M, or about 1.6 M-1.8 M, or about 1.68 M. In some embodiments, the reaction mixture comprises proteinase K. In some embodiments, the proteinase K is present in the reaction mixture at a concentration of about 0.4-2 mg/mL, or about 1 mg/mL. In some embodiments, the proteinase K in the reaction mixture has a specific activity of about 1-6 U/mL, or about 2.5 U/mL.

In some embodiments, the target nucleic acid is in a solution phase and/or associated with the capture probes. In some embodiments, a target nucleic acid is associated with members of a population of target capture probes in the reaction mixture. In some embodiments, the solution phase comprises a sample from an animal, environmental, food, or industrial source. In some embodiments, the solution phase comprises a sample comprising peripheral blood, serum, plasma, cerebrospinal fluid, sputum, urine, or a swab specimen. In some embodiments, wherein the target nucleic acid is derived from peripheral blood, serum, or plasma. In some embodiments, the target nucleic acid is derived from cells that have been treated to release intracellular components into the solution phase.

Another aspect disclosed herein is a kit comprising:
(a) a first component comprising the capture mixture as described herein; and
(b) a second component comprising lithium hydroxide.

In another aspect disclosed herein is a kit comprising:
(a) a first component comprising a pre-mix formulation, wherein the pre-mix formulation comprises the capture mixture as described herein, the pre-mix formulation does not comprise proteinase K, and when the formulation comprises water, the components are present at 1.3× the listed solution concentrations;
(b) a second component comprising lithium hydroxide; and
(c) a third component comprising proteinase K.

In some embodiments, the second component comprises lithium hydroxide at a concentration of about 0.8 M-3.5 M, or about 1.0 M-2.75 M, or about 1.25 M-2.5 M, or about 1.5 M-2.0 M, or about 1.6 M-1.8 M, or about 1.68 M. In some embodiments, the third component comprises proteinase K at a concentration of about 4.5-20 mg/mL, or about 4.5-18 mg/mL, or about 5-15 mg/mL, or about 8-10 mg/mL, or about 9 mg/mL, and the proteinase K has a specific activity of about 12.5-50 U/mL, or about 20-30 U/mL, or about 25 U/mL.

Another aspect disclosed herein is a method for isolating a target nucleic acid from a sample, the method comprising:
a. contacting the capture mixture or the activated capture mixture as described herein with a solution containing target nucleic acids to form a reaction mixture;
b. incubating the reaction mixture in conditions that allow hybridization of the first region of the first population with the target nucleic acid and that allow for association of the SBP (and the SBP3 is present) with the SBP2 immobilized to the support, thereby forming a hybridization complex in contact with a solution phase; and
c. separating the support from the solution phase, thereby isolating the target nucleic acid from other components in the sample.

In some embodiments of the method, step (a) comprises combining the activated capture mixture described herein with an internal control, the solution comprising the target nucleic acid, and an enhancer comprising lithium hydroxide. In some embodiments, the concentration of lithium hydroxide in the enhancer is about 0.8 M-3.5 M, or about 1.0 M-2.75 M, or about 1.25 M-2.5 M, or about 1.5 M-2.0 M, or about 1.6 M-1.8 M, or about 1.68 M. In some embodiments, the capture mixture or activated capture mixture does not comprise the solid support, and step (a) comprises combining the capture mixture or activated capture mixture with the solid support. In some embodiments, the method comprises mixing a capture mixture that lacks proteinase K with proteinase K to form the activated capture mixture.

In some embodiments, the target nucleic acid is derived from a sample that contains cells and the method comprises treating the cells before the contacting step to release intracellular components into the solution. In some embodiments, treating comprises treating the sample with a detergent.

In some embodiments, the incubating is performed in conditions that allow hybridization of the first region of the second population with the target nucleic acid and that allow for association of the SBP3 with the SBP2 immobilized to the support, thereby forming a hybridization complex in contact with the solution phase.

Following incubation in which the capture probe hybridizes nonspecifically to the target nucleic acid and binds specifically to the immobilized SBP2, the complex made up of the immobilized SBP2, capture probe, and target nucleic acid is separated from other sample components by separating the solid support with the attached complex from the solution phase. In some embodiments, the reaction mixture also comprises a complex comprising the poly-(k) capture probe and target nucleic acid and/or a complex comprising the poly-(r) capture probe and target nucleic acid. Then, optionally, washing step(s) may be performed to remove non-nucleic acid sample components that may have adhered to the complex, a component of the complex, or the solid support. In some embodiments, a washing step is performed in which the complex attached to the solid support is washed with a substantially aqueous wash solution that maintains the capture complex on the solid support and then the capture complex attached to the solid support is separated from the washing solution that contains the other sample components. The captured target nucleic acid may be separated from one or more of the other capture complex components before subsequent assay steps are performed, or the capture complex attached to the solid support may be used directly in a subsequent step(s). Subsequent steps include, e.g., detection of the captured target nucleic acid, e.g., using a detection probe, and/or in vitro amplification of one or more sequences contained in the captured target nucleic acid.

In some embodiments, nonspecific target capture involves mixing a sample containing or suspected of containing a target nucleic acid with a capture mixture comprising a nonspecific capture probe, as described herein, in a substantially aqueous solution and conditions that allow the capture probe to hybridize nonspecifically to the target nucleic acid in the mixture. Such conditions may involve elevated temperatures for a short time (e.g., 60° C. for about 15 min) followed by incubation at room temperature (e.g., about 20-25° C. for about 10 to 90 min). Alternatively, the entire incubation may be at room temperature and substantially shorter (e.g., about 5 min). The capture mixture also contains an SBP2 immobilized to a solid support that binds specifically to the nonspecific capture probe via the SBP-SBP2 specific binding pair. The SBP2 may be introduced into the mixture simultaneously with the capture probe, or before or after the capture probe is mixed with the sample. In some embodiments, the immobilized probe is introduced into the mixture of the sample and the nonspecific capture probe after the capture probe has been incubated with the sample to allow the capture probe and the target nucleic acids to hybridize nonspecifically in solution phase before the capture probe binds with the immobilized probe. Thus, the immobilized SBP2 is introduced into the mixture simultaneously with the capture probe to minimize mixing steps, which is particularly useful for automated systems. In an embodiment that uses a capture probe with a tail sequence as the SBP, the capture probe binds specifically to an immobilized complementary sequence (SBP2) under nucleic acid hybridizing conditions to allow the target nucleic acid bind nonspecifically to the capture probe and link to the solid support via the immobilized SBP2 to allow separation of the target nucleic acid from other sample components. The same rationale applies to capture mediated by the SBP3/SBP2 binding pair.

Target capture probe populations, capture mixtures, activated capture mixtures, kits, and methods described herein may be used to isolate a plurality (e.g., two or more) of target nucleic acids from the same sample simultaneously because the nonspecific capture probe binds to more than one species of nucleic acid present in a sample. In some embodiments, nonspecific capture probes may be designed and selected to preferentially capture a particular type of nucleic acid (e.g., RNA) from a sample that contains a mixture of nucleic acids (e.g., DNA and RNA). In some embodiments, nonspecific capture probes may be selectively removed from a mixture by designing the capture probes to selectively bind to different immobilized specific binding partners that are introduced into the mixture, forming specific capture complexes, and then selectively separating each type of complex containing the capture probe and the target nucleic acid. For example, a first population of capture probes that bind preferentially to RNA in a DNA and RNA mixture may bind via an SBP to an immobilized SBP2 on a solid support and a second population of capture probes that bind preferentially to DNA in a DNA and RNA mixture may bind via a SBP3 to an immobilized SBP2 on a solid support. Then, by selectively removing the first and second supports with their attached complexes to different regions of an assay system or at different times during an assay, the RNA components of a sample may be selectively separated from DNA components of the same sample.

In an exemplary embodiment, a reaction mixture is prepared by mixing the target nucleic acid or solution thereof with a capture mixture or activated capture mixture as described herein. The reaction mixture is incubated at a suitable temperature to allow formation of a capture complex comprising a capture probe from the first population, the target nucleic acid, and the immobilized SBP2. In some embodiments, the capture mixture or activated capture mixture comprises the second population of capture probes, and the incubation allows formation of a second capture complex comprising a capture probe from the second population, the target nucleic acid (which may be the same or different from the first target nucleic acid), and the immobilized SBP2. The capture complex(es) on the solid support are then separated from the solution phase. The capture complex(es) on the support optionally are washed to remove remaining portions of the solution phase, and the capture complex(es) on the support are separated from the washing solution. The captured target nucleic acid(s) associated with the solid support(s) are detected to provide a qualitative detection or quantitative measurement of the amount of target nucleic acid that was separated from the other sample components. It will be understood that additional oligonucleotides, such as helper oligonucleotides (U.S. Pat. No. 5,030,557, Hogan et al.) and/or amplification primers may be included in a capture mixture.

Capture mixtures, activated capture mixtures, and kits disclosed herein may be used to separate target nucleic acids from various types of samples. In some embodiments, the sample is from an animal source (e.g., human, non-human vertebrate, non-human mammal), an environmental source (e.g., water, plants, soil, waste), a food source (e.g., food products, food preparation areas), a waste source, or industrial sources (e.g., bioreactors, cell culture wares, pharmaceutical manufacturing wares, biologic reagents, pharmaceutical reagents). Exemplary animal or human sources include peripheral blood (whole blood), serum, plasma, cerebrospinal fluid, sputum, urine, or a swab specimen (e.g., a nasopharyngeal, buccal, wound, vaginal, or penile swab). In some embodiments, the sample is from an animal, environmental, food, waste, or industrial source. In some embodiments, the sample comprises peripheral blood, serum, plasma, urine, cerebrospinal fluid, sputum, urine, or a swab specimen. In some embodiments, the sample comprises a cellular lysate. Accordingly, in some embodiments, a reaction mixture further comprises a sample such as any of the foregoing.

The target nucleic acid may be of viral, prokaryotic, eukaryotic, or synthetic origin or a combination thereof, and may be DNA, RNA, modified nucleic acid, or a combination thereof. In some embodiments, the target nucleic acid comprises DNA. In some embodiments, the target nucleic acid comprises RNA. In some embodiments, the target nucleic acid comprises viral nucleic acid. In some embodiments, the target nucleic acid comprises prokaryotic nucleic acid. In some embodiments, the target nucleic acid comprises eukaryotic nucleic acid. In some embodiments, the target nucleic acid comprises synthetic nucleic acid. In some embodiments, the target nucleic acid comprises a combination of DNA, RNA, viral nucleic acid, bacterial nucleic acid, eukaryotic nucleic acid, and/or synthetic nucleic acid.

Captured target nucleic acids may be detected by using any process that detects nucleic acids. For example, the captured nucleic acids may to detected by using dyes that bind selectively to nucleic acids in general or selectively to a particular form of nucleic acid. Specific nucleic acids may be detected by binding a detection probe that hybridizes specifically to a target sequence in a captured nucleic acid, or target sequences in the captured nucleic acids may be treated by in vitro nucleic acid amplification to amplify part of the captured nucleic acid which then is detected. In some embodiments, the target nucleic acid in the sample is labeled by hybridizing it to a specific detection probe. Detection probe hybridization can occur before, concurrently with, and/or after target capture. A n exemplary form of detection probe is labeled with an acridinium ester (AE) compound that produces a chemiluminescent signal (expressed as relative light units or "RLU") in a homogeneous system by using well known procedures described in detail elsewhere (U.S. Pat. No. 5,658,737, see column 25, lines 27-46, and Nelson et al., 1996, Biochem. 35:8429-8438 at 8432).

This description and exemplary embodiments should not be taken as limiting. For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

EXAMPLES

The following examples are provided to illustrate certain disclosed embodiments and are not to be construed as limiting the scope of this disclosure in any way.

Example 1. Capture Mixture Formulations

Capture Mixture Formulation 1: Poly $dT_{14}$ magnetic particles (Sera-Mag Magnetic Carboxylate-modified, Sigma-Millipore, Cat. No. 44152105050350, or similar particles prepared in house) (200 mg) were allowed to warm to room temperature for 8 to 48 h. Lithium hydroxide monohydrate (28.5 g) was added to water (0.79 L) in a mix container and the resulting mixture was stirred for at least 5 min. Lithium lauryl sulfate (30.0 g) was added to the mix container. The resulting mixture was mixed until the lithium lauryl sulfate was completely dissolved. Once no undissolved solids remained, HEPES (188.0 g, free acid) was added to the mix container and the resulting mixture was mixed for at least 5 min. Succinic acid (27.2 g) was added to the mix container, and the resulting mixture was mixed for at least 5 min. The pH of the resulting mixture was in the range of 7.3 to 7.5. Capture probes (poly-$(k)_{18}$) (0.666 mg) were thawed and added to the mix container. The resulting mixture was mixed for at least 45 min and then the homogeneity was analyzed by testing pH and conductivity on a Biostation. The resulting mixture was filtered. The anti-foaming agent (Foam Ban MS-575; 0.5 mL) was diluted with a portion of the filtered mixture and mixed until the anti-foaming agent was evenly dispersed. The diluted anti-foaming agent was added to the remainder of the filtered mixture with agitation. The resulting bulk mixture was mixed for at least 5 min. The Poly $dT_{14}$ magnetic particles were suspended at a concentration of 10 mg/mL and the suspension was added to the bulk mixture. The resulting capture mixture (1 L) was mixed for 30 to 60 min. The capture mixture was stored for up to 14 days in a closed container at 18 to 25° C.

Additional formulations were prepared using the above method, using the reagents and amounts listed in Table 1. The bulk mixtures were each 1 L total volume. The amount of water needed to reach 1 L total volume was calculated for each formulation composition. In formulations with proteinase K, a pre-mix formulation was prepared with the other materials at 1.3× concentration, and a concentrated solution of proteinase K (e.g., 9 mg/mL, about 25 U/mL specific activity) was added last to the pre-mix formulation in a volume sufficient to provide an activated capture mixture at 1.0× concentration and with the proteinase K at the concentration shown in Table 1.

For example, for Formulation Composition 17, Poly $dT_{14}$ magnetic particles (780 mg) were allowed to warm to room temperature for 8 to 48 h. Lithium hydroxide monohydrate (37.05 g) was added to water (0.65 L) in a mix container and the resulting mixture was stirred for at least 5 min. Lithium lauryl sulfate (39.0 g) was added to the mix container. The resulting mixture was mixed until the lithium lauryl sulfate was completely dissolved. Once no undissolved solids remained, HEPES, free acid (244.4 g), was added to the mix container and the resulting mixture was mixed for at least 5 min. Succinic acid (35.36 g) was added to the mix container, and the resulting mixture was mixed for at least 5 min. The pH of the resulting mixture was in the range of 7.3 to 7.5. Capture probes (poly-$(k)_{18}$ (4.762 mg) and poly-$(r)_{18}$ (4.762 mg)) were thawed and added to the mix container. The resulting mixture was mixed for at least 45 min and pH and conductivity of the mixture were tested on a Biostation. The resulting mixture was filtered. The anti-foaming agent (Foam Ban MS-575; 0.62 mL) was diluted with a portion of the filtered mixture and mixed until the anti-foaming agent was evenly dispersed. The diluted anti-foaming agent was added to the remainder of the filtered mixture with agitation. The resulting bulk mixture was mixed for at least 5 min. The Poly $dT_{14}$ magnetic particles were suspended at a concentration of 10 mg/mL and the suspension was added to the bulk mixture. The resulting pre-capture mixture (0.78 L) was mixed for 30 to 60 min. To an aliquot of the pre-capture mixture (139 mL) was mixed with 9 mg/mL proteinase K (about 25 U/mL; 40 mL) to provide 179 mL of activated capture mixture. The final concentrations of the reagents in the activated capture mixture are shown in Table 1, entry 17.

TABLE 1

Formulation Compositions (listed masses correspond to a volume of 1 L at 1.0X concentration).

| | HEPES (g) | LLS (g) | LiOH[a] (g) | Succinic Acid (g) | Foam Ban (mL) | Poly dT Beads (mg) | $(k)_{18}$ (mg) | $(r)_{18}$ (mg) | PK (mg/mL) |
|---|---|---|---|---|---|---|---|---|---|
| 1 | 188 | 30 | 28.5 | 27.2 | 0.5 | 200 | 0.666 | — | — |
| 2[b] | 188 | 100 | 28.5 | 27.2 | 0.5 | 200 | 0.666 | — | — |
| 3 | 188 | 30 | 28.5 | 27.2 | 0.5 | 200 | 0.666 | — | — |
| 4 | 188 | 30 | 28.5 | 27.2 | 0.5 | 200 | 0.666 | — | 2 |
| 5 | 188 | 100 | 28.5 | 27.2 | 0.5 | 200 | 0.666 | — | — |
| 6 | 188 | 100 | 28.5 | 27.2 | 0.5 | 200 | 0.666 | — | 2 |
| 7 | 188 | 30 | 28.5 | 27.2 | 0.5 | 200 | 0.666 | — | 2 |
| 8 | 188 | 30 | 28.5 | 27.2 | 0.5 | 600 | 0.666 | — | 2 |
| 9 | 188 | 30 | 28.5 | 27.2 | 0.5 | 2000 | 0.666 | — | 2 |
| 10 | 188 | 30 | 28.5 | — | 0.5 | 200 | 3.7 | 3.7 | 2 |
| 11 | 188 | 30 | 19 | — | 0.5 | 200 | 3.7 | 3.7 | 2 |
| 12 | 188 | 30 | 28.5 | — | 0.5 | 600 | 3.7 | 3.7 | 2 |
| 13 | 188 | 30 | 19 | — | 0.5 | 600 | 3.7 | 3.7 | 2 |
| 14 | 188 | 30 | 28.5 | — | 0.5 | 200 | 3.7 | 3.7 | 2 |
| 15 | 188 | 30 | 28.5 | — | 0.5 | 200 | 3.7 | 3.7 | 3 |
| 16 | 188 | 30 | 28.5 | — | 0.5 | 200 | 3.7 | 3.7 | 4 |
| 17 | 188 | 30 | 28.5 | 27.2 | 0.5 | 600 | 3.7 | 3.7 | 2 |
| 18 | 188 | 30 | 28.5 | 27.2 | 0.5 | 200 | 7.4 | | 2 |

[a]Mass of LiOH•$H_2O$
[b]Reagents for Formulation Composition 2 were mixed in water at half-volume and diluted to 1 L after all reagents were combined. The mixture was filtered prior to addition of Foam Ban.

The $(k)_{18}$ and $(r)_{18}$ capture probes used in these experiments comprised a target hybridizing sequence (randomized $(k)_{18}$ and $(r)_{18}$ in which the nucleotide residues contained 2'-methoxyribose) and a capture tail was directly joined to the 3' end of the target hybridizing sequence (the $(k)_{18}$ or $(r)_{18}$ sequence), thereby forming a contiguous nucleic acid sequence as shown below.

$(k)_{18}$ capture probe sequence:

```
                                        (SEQ ID NO: 27)
5'-KKKKKKKKKKKKKKKKKKTTAAAAAAAAAAAAAAAAAAAAAAAA
AAAAA-3'
```

$(r)_{18}$ capture probe sequence:
```
                                        (SEQ ID NO: 28)
5'-RRRRRRRRRRRRRRRRRRTTAAAAAAAAAAAAAAAAAAAAAAAA
AAAAA-3'
```

The stretches of poly-A nucleotides were included to allow the capture probes to hybridize with magnetic microparticles coated with stretches of poly-T nucleotides. One end of a capture probe hybridizes with a magnetic microparticle and the other end of the capture probe hybridizes non-specifically with the target nucleic acid. By applying a magnetic field, the microparticles with the associated capture probes and target nucleic acids are separated out of solution.

Example 2. Whole Blood Processing—Variation of LLS Concentration

This experiments was used to evaluate the effect of LLS concentration on sample lysis.

Whole blood (1000 µL) was used (a) without pre-treatment or (b) following pre-treatment with 0.1 g (100 mg/mL) additional IgG. Formulation Compositions 1 (3% LLS) and 2 (10% LLS) (450 µL) were treated with whole blood sample (a) or (b) (360 To each sample was added 126 µL of aq. LiOH (1.68 M) as an enhancer. Each sample tube was capped and the samples were mixed on an orbital shaker (approx. 200 rpm, 1 min). The samples were incubated in a water bath at 43° C. for 4 min, then at 63° C. for 29 min, and then at 43° C. for 15 min. Test sample 1(a) resulted in visible white clots. Test sample 1(b) (with IgG) produced samples that were completely clotted. Based on visual inspection, samples with 10% final LLS concentration showed a small red pellet without the additional IgG and significant clotting with the IgG. The additional LLS in Formulation Composition 2 significantly reduced the clotting observed in whole blood samples with Formulation Composition 1.

Example 3. Whole Blood Processing—Variation of LLS and Proteinase K

These experiments were used to evaluate sample processing order and proteinase K activity for effects on sample lysis.

Test 1. Whole blood was treated with IgG (100 mg/mL) and mixed with vortexing. Formulation Compositions 3-6 (450 µL) were added to IgG-treated whole blood (360 µL) and 126 µL aq. LiOH (1.68 M) enhancer. Each sample tube was capped and the samples were shaken on an orbital shaker (approx. 200 rpm, 1 min). The samples were incubated in a water bath at 43° C. for 8 min, then at 62° C. for 29 min, and then at 43° C. for 15 min. The magnetic microparticles and bound nucleic acid were separated out of the solution by the application of a magnetic field, allowing the supernatant to be removed from the captured target: capture probe:magnetic microparticle combination. The magnetic microparticles were then resuspended in Wash Solution (10 mM HEPES, 150 mM NaCl, 6.5 mM NaOH, 1 mM EDTA, 0.3% (v/v) ethanol, 0.02% (w/v) methyl paraben, 0.01% (w/v) propyl paraben, and 0.1% (w/v) sodium lauryl sulfate, at pH 7.5). The resuspended microparticles were subjected to one more round of separation, supernatant removal, and resuspension in Wash Solution. Upon separation and removal of the second round of Wash Solution, the microparticles were incubated in 50 µL of Elution Buffer (5 mM Tris in water with preservatives), which disrupts nucleotide hybridization. The magnetic particles were separated by the application of a magnetic field and the nucleic acid containing eluate was recovered.

Test 2. Formulation Compositions 3-6 (450 µL) were combined with IgG-treated whole blood (360 µL) and mixed on an orbital shaker (12 Hz, 1.5 min). The samples were incubated at 43° C. for 8 min, then treated with 126 µL aq. LiOH (1.68 M) enhancer, mixed on an orbital shaker (1 min), and then incubated at 62° C. for 29 min, and then at 43° C. for 15 min. The magnetic beads were processed and the captured nucleic acids collected as described above.

Each of Test 1 and Test 2 produced comparable results on visual inspection (not shown), with clotting levels in the following order (least to most clotting): a) 10% LLS/proteinase K; b) 3% LLS/proteinase K; c) 10% LLS; d) 3% LLS.

Example 4: Target Nucleic Acid Capture—Variation of Concentration of Magnetic Beads (SBP)

Test 1. Whole blood samples were treated with IgG at 100 mg/mL and processed as described herein. To Formulation Compositions 7 and 8 (450 µL) was added an internal control (mixture of plasmid and in vitro transcript). The resulting mixture was treated with the whole blood samples (200 µL), and the resulting mixture was finally treated with the aq. LiOH enhancer at 1.68 M (126 The reaction mixture was incubated and the captured target nucleic acid was isolated as described in Example 3.

Each nucleic acid-containing eluate was assayed for recovery of genomic DNA by real-time PCR using oligomers targeting C1orf43 as shown below in Table 2. As a control, purified DNA that did not undergo target capture was assayed at a copy level representing 100% recovery. Internal control oligomers and an internal control target were also used to exclude false negative results (data not shown).

TABLE 2

| C1orf43 oligomer sequences | |
|---|---|
| Oligomer | Sequence |
| Forward Primer | TGTTTGGGTTTAGGGCATCT (SEQ ID NO: 29) |
| Reverse Primer | AGTTATTCCACATTCACCAAC (SEQ ID NO: 30) |
| Probe | CCACTTGACCTCCCACCAGTTCC (SEQ ID NO: 31) |

The copy level of the captured C1orf43 DNA was inferred from the cycle number at which the real time PCR amplification curve crossed a fixed threshold (CT). Table 3 lists the CT values and estimates the percent recovery of the C1orf43 target nucleic acid using the different Formulation Compositions. The relative difference in recovery between the test conditions was inferred by a comparison of the cycle numbers at which the real-time PCR curves crossed a fixed threshold (CT). The delta CT (ΔCT) for a given condition is defined as the CT of the spiked control minus the CT for that condition. A positive ΔCT indicates that the given condition recovered less than 100% of the theoretical amount of nucleic acid in the sample.

TABLE 3

| Sample | Formulation Composition (mg beads) | Avg CT | ΔCT | % Recovery |
|---|---|---|---|---|
| 1 | 7 (200) | 33.2 | 5.0 | 3.1 |
| 1 | 8 (600) | 30.3 | 2.8 | 14.2 |

TABLE 3-continued

| Sample | Formulation Composition (mg beads) | Avg CT | ΔCT | % Recovery |
|---|---|---|---|---|
| 2 | 7 (200) | 39.4 | 11.2 | 0.04 |
| 2 | 8 (600) | 30.4 | 2.9 | 13.2 |
| 3 | 7 (200) | 39.5 | 11.2 | 0.04 |
| 3 | 8 (600) | 31.2 | 3.7 | 7.4 |

Formulation Composition 8 (600 mg beads) provided lower CT values and greater percent target recoveries of C1orf43 target nucleic acid than Formulation Composition 7 (200 mg beads).

Test 2. Whole blood samples were processed as described in Test 1, and target capture was performed as described herein, using Formulation Compositions 8 and 9, the LiOH enhancer at 1.68 M, and the oligomers indicated below in Table 4 targeting Varicella Zoster virus (VZV) ORF 28.

TABLE 4

VZV ORF 28 oligomer sequences

| Oligomer | Sequence |
|---|---|
| Forward Primer | CCAAAACTAACAAAGCCGGGA (SEQ ID NO: 32) |
| Reverse Primer | GTGATAACTTTCACCCGGAGTTG (SEQ ID NO: 33) |
| Probe | CGAGTGGTAGCGTCTACCCGACC (SEQ ID NO: 34) |

The copy level of the captured VZV ORF 28 was inferred from the cycle number at which the real time PCR amplification curve crossed a fixed threshold (CT). Table 5 lists the CT values and estimates the percent recovery of the VZV ORF 28 target nucleic acid using the different Formulation Compositions. The relative difference in recovery between the test conditions was inferred by a comparison of the cycle numbers at which the real-time PCR curves crossed a fixed threshold (CT). The delta CT (ΔCT) for a given condition is defined as the CT of the spiked control minus the CT for that condition. A positive ΔCT indicates that the given condition recovered less than 100% of the expected amount of nucleic acid in the sample.

TABLE 5

| Sample | Formulation Composition (mg beads) | Avg CT | ΔCT | % Recovery |
|---|---|---|---|---|
| 1 | 8 (600) | 29.1 | 1.8 | 29.3 |
| 1 | 9 (2000) | 28.8 | 2.1 | 23.0 |
| 2 | 8 (600) | 30.1 | 2.8 | 14.7 |
| 2 | 9 (2000) | 30.3 | 3.6 | 8.2 |
| 3 | 8 (600) | 29.0 | 1.6 | 32.0 |
| 3 | 9 (2000) | 29.9 | 3.2 | 10.7 |
| 4 | 8 (600) | 30.0 | 2.7 | 15.1 |
| 4 | 9 (2000) | 29.6 | 2.8 | 13.9 |

Formulation Composition 8 (600 mg beads) provided earlier CTs and higher percent recoveries for VZV ORF 28 target nucleic acid than Formulation Composition 9 (2000 mg beads).

Example 5. Target DNA/RNA Nucleic Acid Capture—Variation of Concentration of LiOH Enhancer Test 1. Whole blood (WB) samples (2.2 mL each) were spiked with cytomegalovirus AD-169, MRC-5 (Zeptometrix, "OC-CMV") at a concentration of 100 $TCID_{50}$/mL and the mixtures were rocked for 15 min. To Formulation Composition 18 (450 µL) was added an internal control, and the resulting mixture was treated with the WB samples (200 The resulting mixture was treated with either 1.68 M or 3.3 M aq. LiOH enhancer (126 The reaction mixture was incubated and the captured nucleic acid was isolated as described in Example 3.

Each nucleic acid-containing eluate was assayed for recovery of genomic DNA by real-time PCR using oligomers targeting OC-CMV as shown below in Table 6. As a control, purified DNA that did not undergo target capture was assayed at a copy level representing 100% recovery. Internal control oligomers and an internal control target were also used to exclude false negative results (data not shown).

TABLE 6

OC-CMV oligomer sequences

| Oligomer | Sequence |
|---|---|
| Forward Primer | CAGATACACTATAGCCGCCG (SEQ ID NO: 35) |
| Reverse Primer | CCATGGAGCTGGAGTGTCTAAAG (SEQ ID NO: 36) |
| Probe | CGTGGACTCCGCCAGTAACACGTT (SEQ ID NO: 37) |

The copy level of the captured OC-CMV DNA was inferred from the cycle number at which the real time PCR amplification curve crossed a fixed threshold (CT). Table 7 lists the CT values of the OC-CMV target nucleic acid using the different Enhancer concentrations. The relative difference in recovery between the test conditions was inferred by a comparison of the cycle numbers at which the real-time PCR curves crossed a fixed threshold (CT). The delta CT (ΔCT) for the test condition (3.3 M enhancer) is defined as the CT of the test condition minus the CT for the baseline condition (1.68 M in this experiment). A positive ΔCT indicates that the given condition recovered less than the amount recovered in the baseline condition.

TABLE 7

| Entry | Enhancer LiOH (M) | Avg CT | ΔCT |
|---|---|---|---|
| 1 | 1.68 | 31.6 | |
| 2 | 3.3 | 39.6 | 8.0 |

Use of an enhancer with a lower LiOH concentration (1.68 M vs. 3.3 M) increased DNA recovery.

Test 2. Whole blood samples (450 diluted 1:3 in 1350 µL of TE buffer), plasma samples, and serum samples were processed as described above and spiked with an RNA or DNA sequence. Samples were treated with Formulation Composition 12 (450 µL; 28.5 g LiOH; 600 mg beads), and LiOH enhancer (126 µL) at concentrations of 1.68 M, 1.5 M, 1.3 M, and 1.0 M, as described herein. The reaction mixture was incubated and the captured nucleic acid was isolated as described in Example 3.

Nucleic acid-containing eluates were assayed for recovery of the spiked sequences by real-time PCR using oligomers targeting the spiked RNA or DNA sequence as shown below in Tables 8 and 9.

TABLE 8

Oligomer sequences for amplifying and detecting spiked RNA

| Oligomer | Sequence |
|---|---|
| Forward Primer | AGGTCGGTACTAACATCAAG (SEQ ID NO: 38) |
| Reverse Primer | CACGTTGTCTGGAAGTTTG (SEQ ID NO: 39) |
| Probe | TAGATGGCCGTCTGTCGTATCCA (SEQ ID NO: 40) |

TABLE 9

Oligomer sequences for amplifying and detecting spiked DNA

| Oligomer | Sequence |
|---|---|
| Forward Primer | ATGGTCAATTAGAGACAAAG (SEQ ID NO: 41) |
| Reverse Primer | CGTTCACTATTGGTCTCTGC (SEQ ID NO: 42) |
| Probe | CGGAATCACAAGTCAATCATCGCGCA (SEQ ID NO: 43) |

The cycle number at which the real time PCR amplification curve crossed a fixed threshold (CT) was determined as a measure of capture efficiency for the various conditions tested. Tables 10 and 11 list the CT values determined for the different Enhancer concentrations.

TABLE 10

RNA Results

| Sample | Enhancer LiOH Concentration (M) | Avg CT |
|---|---|---|
| Plasma | 1.0 | 32.5 |
| | 1.3 | 33.0 |
| | 1.5 | 32.7 |
| | 1.68 | 32.7 |
| Serum | 1.0 | 33.0 |
| | 1.3 | 32.6 |
| | 1.5 | 33.0 |
| | 1.68 | 33.1 |
| WB | 1.0 | 34.6 |
| | 1.3 | 34.6 |
| | 1.5 | 34.6 |
| | 1.68 | 34.2 |

TABLE 11

DNA Results

| Sample | Enhancer LiOH Concentration (M) | Avg CT | pH |
|---|---|---|---|
| Plasma | 1.0 | 27.9 | 8.5 |
| | 1.3 | 27.1 | 8.5 |
| | 1.5 | 26.9 | 8.5 |
| | 1.68 | 26.8 | 9.0 |
| Serum | 1.0 | 28.1 | 8.5 |
| | 1.3 | 27.4 | 8.5 |
| | 1.5 | 27.1 | 8.5 |
| | 1.68 | 26.7 | 9.0 |
| WB | 1.0 | 28.3 | 9.0 |
| | 1.3 | 27.7 | 9.0 |
| | 1.5 | 27.3 | 9.0 |
| | 1.68 | 27.4 | 10.0 |

Lowering the concentration of the LiOH enhancer to 1.5 M or 1.3 M did not impact DNA detection levels. For RNA IC detection, reducing the concentration of the LiOH enhancer to 1.5 M or 1.3 M did not significantly impact RNA detection levels for whole blood or plasma samples, but did impact detection levels for serum samples. RFU of plasma samples is affected with lower LiOH enhancer concentration, but no significant effect was observed for whole blood or serum samples (data not shown).

Example 6. Target Nucleic Acid Capture—Variation of Concentration of LiOH in Capture Mixture and Enhancer in Plasma, Serum, and Whole Blood Samples Plasma, serum, and whole blood samples were thawed and diluted 1:3 in TE buffer. The samples were processed as described above and spiked with an RNA or DNA sequence, and were treated with Formulation Compositions 12 and 13 (28.5 g and 19 g LiOH; 600 mg magnetic beads), and LiOH enhancer at 1.68 M and 1.5 M concentrations, as described above. The reaction mixture was incubated and the captured nucleic acid was isolated as described in Example 3.

Nucleic acid-containing eluates were assayed for recovery of the spiked sequences using oligomers targeting the internal control sequences as described in Example 5, Test 2.

The cycle number at which the real time PCR amplification curve crossed a fixed threshold (CT) was determined as a measure of capture efficiency for the various conditions tested. Tables 12 and 13 list the CT values determined for the different Enhancer concentrations. The relative difference in recovery between the 1.68 M LiOH condition and the other conditions was inferred by a comparison of the cycle numbers at which the real-time PCR curves crossed a fixed threshold (CT). The delta CT (ΔCT) for the test condition is defined as the CT of the test condition minus the CT for the baseline condition (28.5 g LiOH; 1.68 M LiOH for each sample type). A positive ΔCT indicates that the given condition recovered less than the amount recovered in the 1.68 M LiOH condition.

TABLE 12

DNA Results

| Sample | LiOH Amount in Activated Capture Mixture (g) | Enhancer LiOH Concentration (M) | Avg CT | ΔCT |
|---|---|---|---|---|
| Plasma | 28.5 | 1.68 | 27.0 | |
| | 28.5 | 1.5 | 27.2 | 0.2 |
| | 19 | 1.68 | 27.5 | 0.5 |
| | 19 | 1.5 | 28.1 | 1.1 |

TABLE 12-continued

DNA Results

| Sample | LiOH Amount in Activated Capture Mixture (g) | Enhancer LiOH Concentration (M) | Avg CT | ΔCT |
|---|---|---|---|---|
| Serum | 28.5 | 1.68 | 26.8 | |
| | 28.5 | 1.5 | 27.2 | 0.4 |
| | 19 | 1.68 | 27.4 | 0.6 |
| | 19 | 1.5 | 27.9 | 1.1 |
| WB | 28.5 | 1.68 | 27.5 | |
| | 28.5 | 1.5 | 27.9 | 0.3 |
| | 19 | 1.68 | 28.1 | 0.6 |
| | 19 | 1.5 | 28.1 | 1.0 |

TABLE 13

RNA Results

| Sample | LiOH Amount in Activated Capture Mixture (g) | Enhancer LiOH Concentration (M) | Avg CT | ΔCT |
|---|---|---|---|---|
| Plasma | 28.5 | 1.68 | 31.9 | |
| | 28.5 | 1.5 | 32.4 | 0.4 |
| | 19 | 1.68 | 32.2 | 0.3 |
| | 19 | 1.5 | 32.5 | 0.5 |
| Serum | 28.5 | 1.68 | 32.1 | |
| | 28.5 | 1.5 | 32.6 | 0.6 |
| | 19 | 1.68 | 32.0 | 0.0 |
| | 19 | 1.5 | 32.8 | 0.8 |
| WB | 28.5 | 1.68 | 32.4 | |
| | 28.5 | 1.5 | 32.7 | 0.4 |
| | 19 | 1.68 | 32.7 | 0.3 |
| | 19 | 1.5 | 33.1 | 0.7 |

With the higher concentrations of LiOH in the formulation or enhancer, CT values were improved by up to 1 CT. Slight differences between ΔCT values and the apparent difference of Avg CT values are due to rounding error.

Example 7. Target Nucleic Acid Capture—Vary IgG Pre-Treatment and Proteinase K Concentration Plasma samples were treated with 0, 60, 80, or 100 mg/mL IgG as described above. The resulting mixtures were treated with Formulation Compositions 14-16 followed by LiOH enhancer at 1.68 M, and the captured target nucleic acids isolated, as described above.

Nucleic acid-containing eluates were assayed for recovery of a spiked DNA by real-time PCR using oligomers as described in Example 5, Test 2.

The cycle number at which the real time PCR amplification curve crossed a fixed threshold (CT) was determined as a measure of capture efficiency for the various conditions tested. Table 14 lists the CT values determined for the different conditions. The relative difference in recovery between the test conditions was inferred by a comparison of the cycle numbers at which the real-time PCR curves crossed a fixed threshold (CT). The delta CT (ΔCT) for a given condition is defined as the CT of the 3 mg/mL or 4 mg/mL proteinase K experiment for each IgG concentration minus the CT for the 2 mg/mL proteinase K experiment at the same IgG concentration. A positive ΔCT indicates that the given condition recovered less than the amount recovered in the 2 mg/mL proteinase K experiment at the same IgG concentration.

TABLE 14

DNA Results

| Entry | IgG (mg/mL) | Proteinase K (mg/mL) | Avg CT | ΔCT |
|---|---|---|---|---|
| 1 | 0 | 2 | 27.23 | |
| 2 | 0 | 3 | 27.06 | −0.17 |
| 3 | 0 | 4 | 27.41 | 0.18 |
| 4 | 60 | 2 | 30.04 | |
| 5 | 60 | 3 | 30.33 | 0.29 |
| 6 | 60 | 4 | 31.01 | 0.97 |
| 7 | 80 | 2 | 30.04 | |
| 8 | 80 | 3 | 30.03 | −0.01 |
| 9 | 80 | 4 | 30.70 | 0.66 |
| 10 | 100 | 2 | 32.37 | |
| 11 | 100 | 3 | 31.19 | −1.18 |
| 12 | 100 | 4 | 31.74 | −0.63 |

Standard deviations for CT were within 1 CT unit for all samples, with higher standard deviations for samples treated with higher concentrations of IgG, indicating increased variability in PCR results obtained from those samples, likely due to the heterogeneity of such samples.

Increasing proteinase K concentration from 2 to 3 or 4 mg/mL did not produce a statistically significant change in CT or a ΔCT of more than one unit in either direction for most samples.

What is claimed is:

1. A capture mixture for isolating a target nucleic acid from a sample, said capture mixture comprising:
   (a) lithium lauryl sulfate;
   (b) lithium hydroxide; and
   (c) a zwitterionic sulfonic acid buffering agent;
   wherein:
   (i) the lithium lauryl sulfate is present at a concentration of about 35-120 g/L; and
   (ii) the lithium hydroxide is present at a concentration of about 14-50 g/L;
   and further wherein:
   (iii) the capture mixture comprises a $C_{2-6}$ dicarboxylic acid; and/or
   (iv) the capture mixture comprises proteinase K; and/or
   (v) the capture mixture comprises (1) a first population of capture probes, comprising a first region that is at least about 12 residues in length and comprises at least one poly (k) sequence comprising a randomized sequence comprising G and U/T nucleotides, or a non-randomized repeating (G and U/T) sequence, or a combination thereof; and a second region comprising a first specific binding partner (SBP), wherein the SBP is capable of specifically binding a second specific binding partner (SBP2); and (2) a second population of capture probes, comprising a first region that is at least about 12 residues in length and comprises a poly (r) sequence comprising a randomized sequence comprising G and A nucleotides, a non-randomized repeating (A and G) sequence, or a combination thereof; and a second region comprising a third specific binding partner (SBP3), wherein the SBP3 is capable of specifically binding the SBP2; and/or
   (vi) the capture mixture comprises a solid support comprising the SBP2 immobilized thereto; wherein the solid support is beads and the beads are present at a concentration of about 0.15%-1% by weight relative to total solids in the mixture or about 300-2800 mg/L; and/or
   (vii) the capture mixture does not comprise one or more of a phosphate buffer, a chelator, or LiCl.

2. The capture mixture of claim 1, wherein the capture mixture comprises water.

3. The capture mixture of claim 1, wherein the zwitterionic sulfonic acid buffering agent is 4-(2-hydroxyethyl)-1-piperazineethanesulfonic acid (HEPES) present at a concentration of about 50%-85%, or about 52.5%-57.5%, or about 64%-70%, or about 72%-82% relative to the total solids in the mixture, or a concentration of about 150-275 g/L, or about 175-260 g/L, or about 170-200 g/L, or about 244 g/L, or about 188 g/L.

4. The capture mixture of claim 2, further comprising an anti-foaming agent, optionally wherein the anti-foaming agent is a 3-dimensional siloxane defoamer, and the 3-dimensional siloxane defoamer is emulsified in water, wherein the anti-foaming agent is present at a concentration of from about 0.02% w/v to about 0.1% w/v, or from about 0.03% w/v to about 0.08% w/v, or from about 0.03% w/v to about 0.05% w/v, or about 0.05% w/v, or about 0.04% w/v.

5. The capture mixture of claim 1, comprising:
(a) lithium lauryl sulfate;
(b) lithium hydroxide;
(c) the zwitterionic sulfonic acid buffering agent;
(d) the $C_{2-6}$ dicarboxylic acid; and
(e) proteinase K.

6. A pre-mix formulation comprising the capture mixture of claim 1, wherein the pre-mix formulation does not comprise proteinase K, and when the formulation comprises water, the components are present at 1.3X the listed solution concentrations.

7. The pre-mix formulation of claim 6, comprising about 244 g/L HEPES, about 39 g/L lithium lauryl sulfate, about 37 g/L lithium hydroxide, about 35 g/L succinic acid, about 0.04% w/v anti-foaming agent, about 3.7 mg/mL each of the first population of capture probes and the second population of capture probes, and about 780 mg/L of SBP2 immobilized on beads.

8. An activated capture mixture comprising the capture mixture of claim 1, wherein the capture mixture comprises proteinase K.

9. An activated capture mixture prepared by combining the pre-mix formulation of claim 6 and proteinase K.

10. A method for isolating a target nucleic acid from a sample, the method comprising:
   a. contacting the capture mixture of claim 1 or the activated capture mixture of claim 8 which includes the first population of capture probes with a solution comprising a target nucleic acid to form a reaction mixture;
   b. incubating the reaction mixture in conditions that allow hybridization of the first region of the first population with the target nucleic acid;
   c. simultaneously with or subsequently to step (b), incubating the reaction mixture with a solid support comprising the SBP2 immobilized thereto in conditions that allow for association of the SBP and the SBP3 with the SBP2 immobilized to the support, thereby forming a hybridization complex in contact with a solution phase; and
   d. separating the support from the solution phase, thereby isolating the target nucleic acid from other components in the sample.

11. The method of claim 10, wherein the target nucleic acid is derived from a sample that contains cells and the method comprises treating the cells before the contacting step to release intracellular components into the solution.

12. The method of claim 11, wherein treating comprises treating the sample with a detergent.

13. A kit comprising:
(a) a first component comprising the capture mixture of claim 1; and
(b) a second component comprising lithium hydroxide.

14. A kit comprising:
a first component comprising a pre-mix formulation, wherein (i) the pre-(a) mix formulation comprises the capture mixture of claim 1, the pre-mix formulation does not comprise proteinase K, and when the formulation comprises water, the components are optionally present at 1.3X the listed solution concentrations, or (ii) the pre-mix formulation is the pre-mix formulation of claim 6;
(b) a second component comprising lithium hydroxide; and
(c) a third component comprising proteinase K.

* * * * *

SEQUENCE LISTING

```
<160> NUMBER OF SEQ ID NOS: 43

<210> SEQ ID NO 1
<211> LENGTH: 14
<212> TYPE: DNA
<213> ORGANISM: Artificial Sequence
<220> FEATURE:
<223> OTHER INFORMATION: Non-specific capture probe

<400> SEQUENCE: 1
kkkkkkaaak kkkk                                                        14

<210> SEQ ID NO 2
<211> LENGTH: 12
<212> TYPE: DNA
<213> ORGANISM: Artificial Sequence
<220> FEATURE:
<223> OTHER INFORMATION: Non-specific capture probe
```

```
<220> FEATURE:
<221> NAME/KEY: misc_feature
<222> LOCATION: (1)..(5)
<223> OTHER INFORMATION: locked nucleic acid (LNA) conformation

<400> SEQUENCE: 2
kkkkkaaakk kk                                                              12

<210> SEQ ID NO 3
<211> LENGTH: 40
<212> TYPE: DNA
<213> ORGANISM: Artificial Sequence
<220> FEATURE:
<223> OTHER INFORMATION: Non-specific capture probe
<220> FEATURE:
<221> NAME/KEY: misc_feature
<222> LOCATION: (1)..(10)
<223> OTHER INFORMATION: 2'-methoxy linkages

<400> SEQUENCE: 3
kkkkkkkkkk aaaaaaaaaa aaaaaaaaaa aaaaaaaaaa                                40

<210> SEQ ID NO 4
<211> LENGTH: 14
<212> TYPE: DNA
<213> ORGANISM: Artificial Sequence
<220> FEATURE:
<223> OTHER INFORMATION: Non-specific capture probe

<400> SEQUENCE: 4
rrrrrrtttr rrrr                                                            14

<210> SEQ ID NO 5
<211> LENGTH: 12
<212> TYPE: DNA
<213> ORGANISM: Artificial Sequence
<220> FEATURE:
<223> OTHER INFORMATION: Non-specific capture probe
<220> FEATURE:
<221> NAME/KEY: misc_feature
<222> LOCATION: (1)..(5)
<223> OTHER INFORMATION: locked nucleic acid (LNA) conformation

<400> SEQUENCE: 5
rrrrraaarr rr                                                              12

<210> SEQ ID NO 6
<211> LENGTH: 40
<212> TYPE: DNA
<213> ORGANISM: Artificial Sequence
<220> FEATURE:
<223> OTHER INFORMATION: Non-specific capture probe
<220> FEATURE:
<221> NAME/KEY: misc-feature
<222> LOCATION: (1)..(10)
<223> OTHER INFORMATION: 2'-methoxy linkages

<400> SEQUENCE: 6
rrrrrrrrrr aaaaaaaaaa aaaaaaaaaa aaaaaaaaaa                                40

<210> SEQ ID NO 7
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 7
```
tggttggttg gt                                                          12

<210> SEQ ID NO 8
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 8
ugguugguug gu                                                          12

<210> SEQ ID NO 9
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 9
tgtgtggttg tg                                                          12

<210> SEQ ID NO 10
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 10
ugugugguug ug                                                          12

<210> SEQ ID NO 11
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 11
ttggttgttt tg                                                          12

<210> SEQ ID NO 12
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 12
uugguuguuu ug                                                          12

<210> SEQ ID NO 13
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 13
ttgttgttgt tg                                                          12

<210> SEQ ID NO 14
<211> LENGTH: 12
<212> TYPE: DNA
<213> ORGANISM: Artificial Sequence

```
<220> FEATURE:
<223> OTHER INFORMATION: exemplary non-randomized repeating sequence

<400> SEQUENCE: 14
uuguuguugu ug                                                          12

<210> SEQ ID NO 15
<211> LENGTH: 13
<212> TYPE: DNA
<213> ORGANISM: Artificial Sequence
<220> FEATURE:
<223> OTHER INFORMATION: exemplary non-randomized repeating sequence

<400> SEQUENCE: 15
ttgttgttgt tgt                                                         13

<210> SEQ ID NO 16
<211> LENGTH: 13
<212> TYPE: DNA
<213> ORGANISM: Artificial Sequence
<220> FEATURE:
<223> OTHER INFORMATION: exemplary non-randomized repeating sequence

<400> SEQUENCE: 16
uuguuguugu ugu                                                         13

<210> SEQ ID NO 17
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 17
aggaaggaag ga                                                          12

<210> SEQ ID NO 18
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 18
agagaggaag ag                                                          12

<210> SEQ ID NO 19
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 19
aaggaagaaa ag                                                          12

<210> SEQ ID NO 20
<211> LENGTH: 12
<212> TYPE: DNA
<213> ORGANISM: Artificial Sequence
<220> FEATURE:
<223> OTHER INFORMATION: exemplary non-randomized repeating sequence

<400> SEQUENCE: 20
aagaagaaga ag                                                          12
```

```
<210> SEQ ID NO 21
<211> LENGTH: 13
<212> TYPE: DNA
<213> ORGANISM: Artificial Sequence
<220> FEATURE:
<223> OTHER INFORMATION: exemplary non-randomized repeating sequence

<400> SEQUENCE: 21
aagaagaaga aga                                                          13

<210> SEQ ID NO 22
<211> LENGTH: 33
<212> TYPE: DNA
<213> ORGANISM: Artificial Sequence
<220> FEATURE:
<223> OTHER INFORMATION: non-specific capture probe
<220> FEATURE:
<221> NAME/KEY: misc_feature
<222> LOCATION: (1)..(3)
<223> OTHER INFORMATION: t is present or absent in each position
<220> FEATURE:
<221> NAME/KEY: misc_feature
<222> LOCATION: (19)..(30)
<223> OTHER INFORMATION: a is present or absent in each position
<220> FEATURE:
<221> NAME/KEY: misc_feature
<222> LOCATION: (31)..(33)
<223> OTHER INFORMATION: n is a, c, g, or t

<400> SEQUENCE: 22
nnnaaaaaaa aaaaaaaaaa annnnnnnnn nnn                                    33

<210> SEQ ID NO 23
<211> LENGTH: 33
<212> TYPE: DNA
<213> ORGANISM: Artificial Sequence
<220> FEATURE:
<223> OTHER INFORMATION: non-specific capture probe

<400> SEQUENCE: 23
tttaaaaaaa aaaaaaaaaa aaaaaaaaaa aaa                                    33

<210> SEQ ID NO 24
<211> LENGTH: 30
<212> TYPE: DNA
<213> ORGANISM: Artificial Sequence
<220> FEATURE:
<223> OTHER INFORMATION: non-specific capture probe

<400> SEQUENCE: 24
aaaaaaaaaa aaaaaaaaaa aaaaaaaaaa                                        30

<210> SEQ ID NO 25

<400> SEQUENCE: 25

000

<210> SEQ ID NO 26

<400> SEQUENCE: 26

000

<210> SEQ ID NO 27
<211> LENGTH: 51
<212> TYPE: DNA
<213> ORGANISM: Artificial Sequence
```

```
<220> FEATURE:
<223> OTHER INFORMATION: (k)18 capture probe sequence

<400> SEQUENCE: 27
kkkkkkkkkk kkkkkkkktt taaaaaaaaa aaaaaaaaaa aaaaaaaaaa a        51

<210> SEQ ID NO 28
<211> LENGTH: 51
<212> TYPE: DNA
<213> ORGANISM: Artificial Sequence
<220> FEATURE:
<223> OTHER INFORMATION: (r)18 capture probe sequence

<400> SEQUENCE: 28
rrrrrrrrrr rrrrrrrrtt taaaaaaaaa aaaaaaaaaa aaaaaaaaaa a        51

<210> SEQ ID NO 29
<211> LENGTH: 20
<212> TYPE: DNA
<213> ORGANISM: Artificial Sequence
<220> FEATURE:
<223> OTHER INFORMATION: C1orf43 forward primer

<400> SEQUENCE: 29
tgtttgggtt tagggcatct                                           20

<210> SEQ ID NO 30
<211> LENGTH: 21
<212> TYPE: DNA
<213> ORGANISM: Artificial Sequence
<220> FEATURE:
<223> OTHER INFORMATION: C1orf43 reverse primer

<400> SEQUENCE: 30
agttattcca cattcaccaa c                                         21

<210> SEQ ID NO 31
<211> LENGTH: 23
<212> TYPE: DNA
<213> ORGANISM: Artificial Sequence
<220> FEATURE:
<223> OTHER INFORMATION: C1orf43 probe

<400> SEQUENCE: 31
ccacttgacc tcccaccagt tcc                                       23

<210> SEQ ID NO 32
<211> LENGTH: 21
<212> TYPE: DNA
<213> ORGANISM: Artificial Sequence
<220> FEATURE:
<223> OTHER INFORMATION: VZV ORF 28 forward primer

<400> SEQUENCE: 32
ccaaaactaa caaagccggg a                                         21

<210> SEQ ID NO 33
<211> LENGTH: 23
<212> TYPE: DNA
<213> ORGANISM: Artificial Sequence
<220> FEATURE:
<223> OTHER INFORMATION: VZV ORF 28 reverse primer

<400> SEQUENCE: 33
gtgataactt tcacccggag ttg                                       23
```

```
<210> SEQ ID NO 34
<211> LENGTH: 23
<212> TYPE: DNA
<213> ORGANISM: Artificial Sequence
<220> FEATURE:
<223> OTHER INFORMATION: VZV ORF 28 probe

<400> SEQUENCE: 34
cgagtggtag cgtctacccg acc                                              23

<210> SEQ ID NO 35
<211> LENGTH: 20
<212> TYPE: DNA
<213> ORGANISM: Artificial Sequence
<220> FEATURE:
<223> OTHER INFORMATION: OC-CMV forward primer

<400> SEQUENCE: 35
cagatacact atagccgccg                                                  20

<210> SEQ ID NO 36
<211> LENGTH: 23
<212> TYPE: DNA
<213> ORGANISM: Artificial Sequence
<220> FEATURE:
<223> OTHER INFORMATION: OC-CMV reverse primer

<400> SEQUENCE: 36
ccatggagct ggagtgtcta aag                                              23

<210> SEQ ID NO 37
<211> LENGTH: 24
<212> TYPE: DNA
<213> ORGANISM: Artificial Sequence
<220> FEATURE:
<223> OTHER INFORMATION: OC-CMV probe

<400> SEQUENCE: 37
cgtggactcc gccagtaaca cgtt                                             24

<210> SEQ ID NO 38
<211> LENGTH: 20
<212> TYPE: DNA
<213> ORGANISM: Artificial Sequence
<220> FEATURE:
<223> OTHER INFORMATION: forward primer targeting spiked RNA

<400> SEQUENCE: 38
aggtcggtac taacatcaag                                                  20

<210> SEQ ID NO 39
<211> LENGTH: 19
<212> TYPE: DNA
<213> ORGANISM: Artificial Sequence
<220> FEATURE:
<223> OTHER INFORMATION: reverse primer targeting spiked RNA

<400> SEQUENCE: 39
cacgttgtct ggaagtttg                                                   19

<210> SEQ ID NO 40
<211> LENGTH: 23
<212> TYPE: DNA
<213> ORGANISM: Artificial Sequence
<220> FEATURE:
<223> OTHER INFORMATION: probe targeting spiked RNA
```

```
<400> SEQUENCE: 40
tagatggccg tctgtcgtat cca                                              23

<210> SEQ ID NO 41
<211> LENGTH: 20
<212> TYPE: DNA
<213> ORGANISM: Artificial Sequence
<220> FEATURE:
<223> OTHER INFORMATION: forward primer targeting spiked DNA

<400> SEQUENCE: 41
atggtcaatt agagacaaag                                                  20

<210> SEQ ID NO 42
<211> LENGTH: 20
<212> TYPE: DNA
<213> ORGANISM: Artificial Sequence
<220> FEATURE:
<223> OTHER INFORMATION: reverse primer targeting spiked DNA

<400> SEQUENCE: 42
cgttcactat tggtctctgc                                                  20

<210> SEQ ID NO 43
<211> LENGTH: 26
<212> TYPE: DNA
<213> ORGANISM: Artificial Sequence
<220> FEATURE:
<223> OTHER INFORMATION: probe targeting spiked DNA

<400> SEQUENCE: 43
cggaatcaca agtcaatcat cgcgca                                           26
```